United States Patent
Takahashi

(10) Patent No.: US 12,083,422 B2
(45) Date of Patent: Sep. 10, 2024

(54) INFORMATION SYSTEM, SERVICE SERVER, MANAGEMENT SERVER, INFORMATION PROCESSING METHOD, AND RECORDING MEDIUM

(71) Applicant: Diarkis Inc., Tokyo (JP)

(72) Inventor: Nobuyori Takahashi, Tokyo (JP)

(73) Assignee: DIARKIS INC., Tokyo (JP)

( * ) Notice: Subject to any disclaimer, the term of this patent is extended or adjusted under 35 U.S.C. 154(b) by 0 days.

(21) Appl. No.: 18/363,354

(22) Filed: Aug. 1, 2023

(65) Prior Publication Data

US 2023/0372811 A1 Nov. 23, 2023

Related U.S. Application Data

(62) Division of application No. 18/018,998, filed as application No. PCT/JP2021/028561 on Aug. 2, 2021, now Pat. No. 11,771,983.

(30) Foreign Application Priority Data

Jul. 31, 2020 (JP) ................. 2020-130170

(51) Int. Cl.
*A63F 13/30* (2014.01)
*A63F 13/35* (2014.01)

(52) U.S. Cl.
CPC .................... *A63F 13/35* (2014.09)

(58) Field of Classification Search
CPC ........ A63F 13/35; A63F 13/30; A63F 13/352; A63F 2300/50; A63F 2300/51; A63F 2300/535; G06F 9/50

(Continued)

(56) References Cited

U.S. PATENT DOCUMENTS 6,574,229 B1 6/2003 Takahashi et al.
7,657,628 B1 2/2010 McDysan et al.
(Continued)

FOREIGN PATENT DOCUMENTS

JP 2000-132524 A 5/2000
JP 2010-86145 A 4/2010
(Continued)

OTHER PUBLICATIONS

International Search Report issued in corresponding International Application No. PCT/JP2021/028561 dated Sep. 28, 2021, w/ English Translation (5 pages).

(Continued)

*Primary Examiner* — Michael A Cuff
(74) *Attorney, Agent, or Firm* — Rimon P.C.

(57) ABSTRACT

An information system includes: a self-status storage unit in which self-status information is stored; an other-status storage unit in which status information of another service server is stored; a service unit that provides a service to terminal apparatuses; a status transmitting unit that transmits the self-status information to a management server; a status receiving unit that receives other-status information from the management server; a first determining unit that determines whether or not the self-status information satisfies a first condition; and a transfer processing unit that performs transfer processing, which is processing for enabling any one or more terminal apparatuses to which a service is being provided by the service unit to receive a service from another service server, in the case in which it is determined that the first condition is satisfied.

5 Claims, 15 Drawing Sheets

(58) Field of Classification Search
USPC .......................................................... 463/42
See application file for complete search history.

(56) References Cited

U.S. PATENT DOCUMENTS

| | | |
|---|---|---|
| 7,840,683 B2 | 11/2010 | Zhang |
| 8,556,724 B2 | 10/2013 | Dale et al. |
| 11,196,821 B2 | 12/2021 | Yang et al. |
| 2009/0125589 A1 | 5/2009 | Anand et al. |
| 2013/0097645 A1* | 4/2013 | Kim ................. H04N 21/64322 |
| | | 725/93 |
| 2018/0241825 A1 | 8/2018 | Bolton et al. |

FOREIGN PATENT DOCUMENTS

| | | |
|---|---|---|
| JP | 2012-9939 A | 1/2012 |
| JP | 2020110674 A | 7/2020 |

OTHER PUBLICATIONS

Office Action issued in corresponding Japanese Application No. 2020-130170 dated Mar. 2, 2021, w/ English Translation (9 pages).
Office Action issued in corresponding Japanese Application No. 2021-042794 dated Jun. 8, 2021, w/ English Translation (8 pages).
Notice of Allowance issued in corresponding U.S. Appl. No. 18/018,998 dated Jun. 26, 2023 (9 pages).
Office Action issued in corresponding U.S. Appl. No. 18/018,998 dated May 9, 2023 (7 pages).
Notice of Reasons for Refusal dated May 28, 2024 issued in the corresponding Japanese Patent Application No. 2021-127166, with English translation.

* cited by examiner

INFORMATION SYSTEM, SERVICE SERVER, MANAGEMENT SERVER, INFORMATION PROCESSING METHOD, AND RECORDING MEDIUM

CROSS REFERENCE TO RELATED APPLICATIONS

This application is a divisional of U.S. patent application Ser. No. 18/018,998, filed Jan. 31, 2023, which is a U.S. National Phase under 35 U.S.C. § 371 of International Application No. PCT/JP2021/028561, filed on Aug. 2, 2021, which in turn claims the benefit of Japanese Application No. 2020-130170, filed on Jul. 31, 2020, the entire contents of each are hereby incorporated by reference.

TECHNICAL FIELD

The present invention relates to an information system and the like for providing a service to multiple terminal apparatuses.

BACKGROUND ART

Conventionally, there have been systems that provide a mechanism for easily enabling multiple players to enjoy the same game via a communication network (see Patent Document 1).

The game server constituting such a system is connected to multiple game terminals via a communication network. In response to a group request transmitted from a first game terminal, the game server opens an area room corresponding to the first game terminal in the case in which there is no second game terminal that transmitted a group request with the same room ID as the first game terminal, within a predetermined distance from the first game terminal, or assigns the first game terminal to an area room to which the second game terminal is assigned in the case in which there is such a second game terminal. When multiple game terminals are matched in an area room, common game setting information is provided to the game terminals assigned to the area room.

CITATION LIST

Patent Document

Patent Document 1: JP 2020-110674A

SUMMARY OF INVENTION

Technical Problem

However, in conventional technologies, it was not possible to provide an information system that is robust to failures of a service server that provides a service to terminal apparatuses. That is to say, in conventional technologies, for example, if a game server goes down, it is not possible to continue providing the service of games to terminal apparatuses.

Solution to Problem

A first aspect of the present invention is directed to an information system including: two or more service servers that provide a service to one or more terminal apparatuses; and a management server, wherein each service server includes: a self-status storage unit in which self-status information regarding a status of the service server is stored; an other-status storage unit in which one or more pieces of other-status information each regarding a status of another service server are stored; a service unit that provides a service to one or more terminal apparatuses; a status transmitting unit that transmits the self-status information to the management server; a status receiving unit that receives one or more pieces of other-status information from the management server; an other-status accumulating unit that accumulates the one or more pieces of other-status information received by the status receiving unit, in the other-status storage unit; a first determining unit that determines whether or not the self-status information satisfies a first condition; and a transfer processing unit that performs transfer processing, which is processing for enabling any one or more terminal apparatuses to which a service is being provided by the service unit to receive a service from another service server, in a case in which the first determining unit determines that the first condition is satisfied, and the management server includes: a management receiving unit that receives self-status information from each of the two or more service servers; and a management transmitting unit that transmits, to each of the two or more service servers, one or more pieces of other-status information at least that are not status information of a service server to which the other-status information is to be transmitted, out of the two or more pieces of self-status information received by the management receiving unit.

With this configuration, it is possible to provide an information system that is robust to failures of a service server that provides a service to terminal apparatuses.

Furthermore, a second aspect of the present invention is directed to the information system according to the first aspect, wherein the transfer processing unit includes: a transfer server determining part that determines another service server from which any one or more terminal apparatuses, out of the one or more terminal apparatuses to which a service is being provided by the service unit, are to receive a service, using the one or more pieces of other-status information; and a transfer processing part that performs transfer processing for enabling any one or more terminal apparatuses to which a service is being provided by the service unit to receive a service from the other service server determined by the transfer server determining part.

With this configuration, it is possible to provide an information system that is robust to failures of a service server that provides a service to terminal apparatuses.

Furthermore, a third aspect of the present invention is directed to the information system according to the first or second aspect, wherein the transfer processing unit includes: a transfer request receiving part that receives a transfer request containing terminal service information, which is information associated with a terminal identifier and indicating a status of a terminal apparatus to which a service is being provided by the service unit; and a communication starting part that starts communication with a terminal apparatus identified with a terminal identifier corresponding to the transfer request, and the service unit provides a service to the terminal apparatus identified with the terminal identifier corresponding to the transfer request, using the terminal service information contained in the transfer request.

With this configuration, it is possible to provide an information system that is robust to failures of a service server that provides a service to terminal apparatuses.

Furthermore, a fourth aspect of the present invention is directed to the information system according to any one of the first to third aspects, wherein the status transmitting unit further transmits specifying information for specifying a version of latest one or more pieces of other-status information received by the status receiving unit, to the management server, the management receiving unit further receives the specifying information from the service server, and the management transmitting unit transmits one or more pieces of other-status information to each of the two or more service servers, in a case in which a version indicated by the specifying information received by the management receiving unit does not match the version corresponding to the latest two or more pieces of status information received by the management receiving unit.

With this configuration, it is possible to reduce the communication amount between the service servers and the management server.

Furthermore, a fifth aspect of the present invention is directed to the information system according to any one of the first to fourth aspects, wherein the status receiving unit receives status information of all of the two or more service servers from the management server, and the management transmitting unit transmits all of the two or more pieces of self-status information received by the management receiving unit, to each of the two or more service servers.

With this configuration, it is possible to reduce the processing amount of the management server.

Furthermore, a sixth aspect of the present invention is directed to the information system according to any one of the first to fifth aspects, wherein the status transmitting unit generally periodically transmits the self-status information to the management server, and the management transmitting unit generally periodically transmits the one or more pieces of other-status information to each of the two or more service servers.

With this configuration, it is possible to reduce the communication amount between the service servers and the management server.

Furthermore, a seventh aspect of the present invention is directed to the information system according to any one of the first to sixth aspects, wherein the service server further includes a status updating unit that acquires self-status information of the service server and accumulates the self-status information in the self-status storage unit.

With this configuration, it is possible to update the self-status information.

Furthermore, an eighth aspect of the present invention is directed to the information system according to any one of the first to seventh aspects, wherein the service server further includes a down unit that performs down processing for going down in a case in which a second condition is satisfied.

With this configuration, it is possible to appropriately cause the service server to go down.

Furthermore, a ninth aspect of the present invention is directed to the information system according to the eighth aspect, wherein the down unit performs the down processing after the transfer processing unit has completed the transfer processing on all terminal apparatuses to which a service is being provided by the service unit.

With this configuration, before a service server goes down, transfer is performed that enables terminal apparatuses to which a service is being provided by the service server to receive a service from another service server, and thus it is possible to appropriately cause the service server to go down.

Furthermore, a tenth aspect of the present invention is directed to the information system according to any one of the first to ninth aspects, wherein the service server further includes a request receiving unit that receives a request from a terminal apparatus, and the first determining unit refers to the self-status information, and determines whether or not the request satisfies the first condition.

With this configuration, it is possible to appropriately perform transfer that enables terminal apparatuses to which a service is being provided by the service server to receive a service from another service server.

Furthermore, an eleventh aspect of the present invention is directed to the information system according to any one of the first to tenth aspects, wherein the service server further includes a startup unit that performs startup processing for starting up the service server that is inactive, in a case in which a third condition is satisfied.

With this configuration, it is possible to appropriately start up the service server.

Furthermore, a twelfth aspect of the present invention is directed to the information system according to any one of the first to eleventh aspects, wherein the service server further includes: a user attribute value receiving unit that receives one or more user attribute values from a terminal apparatus; a grouping unit that acquires two or more terminal identifiers for identifying terminal apparatuses that satisfy an attribute value condition corresponding to the one or more user attribute values received by the user attribute value receiving unit, thereby acquiring a group list having the two or more terminal identifiers; and a group list transmitting unit that transmits the group list to a terminal apparatus.

With this configuration, it is possible to appropriately create a group of terminal apparatuses.

Furthermore, a thirteenth aspect of the present invention is directed to the information system according to the twelfth aspect, wherein the grouping unit includes: a request transmitting part that transmits a terminal selecting request containing the one or more user attribute values received by the user attribute value receiving unit to one or more other service servers; a terminal identifier receiving part that receives terminal identifiers of one or more terminal apparatuses that satisfy an attribute value condition, in response to transmission of the terminal selecting request; and a group list configuring part that configures a group list containing one or more terminal identifiers received by the terminal identifier receiving part.

With this configuration, it is possible to more appropriately create a group of terminal apparatuses.

Furthermore, a fourteenth aspect of the present invention is directed to the information system according to the thirteenth aspect, further including: a user attribute value storage unit in which one or more user attribute values of a terminal apparatus to which a service is being provided by the service unit are stored in association with a terminal identifier; and a selecting request receiving unit that receives a terminal selecting request from another service server, wherein the grouping unit further includes: a terminal selecting part that selects one or more terminal apparatuses corresponding to a user attribute value that matches the terminal selecting request received by the selecting request receiving unit, out of the terminal apparatuses to which a service is being provided by the service unit, and acquires terminal identifiers for respectively identifying the one or more terminal apparatuses 4; and a terminal identifier transmitting part that transmits the one or more terminal identifiers acquired by the terminal selecting part, to the service server that transmitted the terminal selecting request.

With this configuration, it is possible to more appropriately create a group of terminal apparatuses.

Furthermore, a fifteenth aspect of the present invention is directed to the information system according to any one of the first to fourteenth aspects, wherein the service that is provided by the service server to one or more terminal apparatuses is a game.

With this configuration, it is possible to enable users to continuously enjoy a game even when the service server that is providing the service to the terminal apparatus fails.

Advantageous Effects of Invention

According to the information system of the present invention, it is possible to provide an information system that is robust to failures of a service server that provides a service to terminal apparatuses.

DESCRIPTION OF EMBODIMENT

Figure 1:
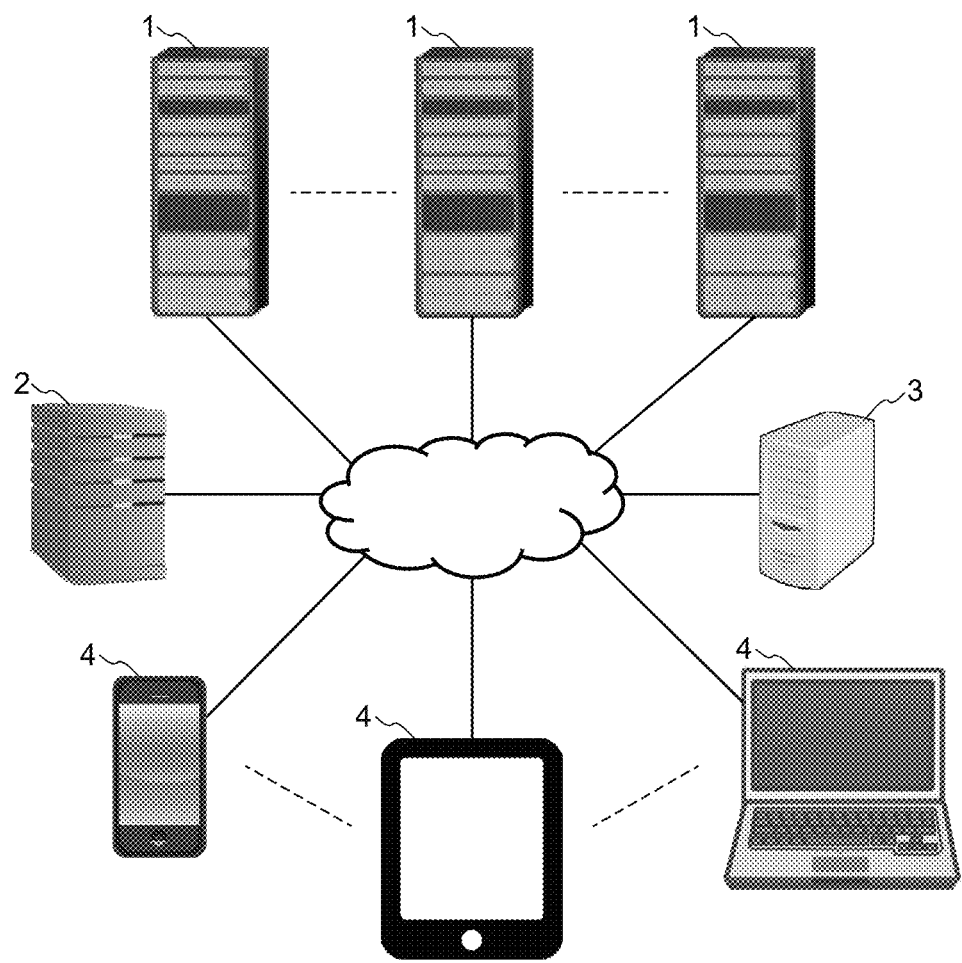
FIG. 1 is a conceptual diagram of an information system A in Embodiment 1.

Hereinafter, an embodiment of the information system and the like will be described with reference to the drawings. It should be noted that constituent elements denoted by the same reference numerals in the embodiments perform similar operations, and thus a description thereof may not be repeated.

Embodiment 1

In this embodiment, an information system including two or more service servers and a management server will be described. Each service server provides a service to one or more terminal apparatuses, and transmits status information to the management server. Furthermore, the service server receives status information of another service server from the management server. The management server receives status information from each of the service servers, and transmits, to each of the service servers, status information of another service server. As a result, the service servers also manage the status information of another service server. Then, if status information of one service server satisfies a first condition, the service server refers to the status information of another service server, determines another service server from which a terminal apparatus that is receiving a service from the one service server or a terminal apparatus that accessed the one service server is to receive a service, and performs transfer processing for enabling the terminal apparatus to receive a service from the other service server. Various methods and the like are conceivable for the communication method, the frequency, and the like of communication between the service servers and the management server. The service servers typically update the self-status information frequently or constantly.

Furthermore, in this embodiment, an information system that performs processing for causing the service server to go down in the case in which the service server satisfies a second condition will be described.

Furthermore, in this embodiment, an information system that performs processing for starting up the service server that is inactive, in the case in which the service server satisfies a third condition, will be described.

Furthermore, in this embodiment, an information system that performs matchmaking for two or more terminal apparatuses will be described.

Moreover, in this embodiment, an information system that further includes an external server that controls the startup and down processing of the service server will be described.

FIG. 1 is a conceptual diagram of an information system A in this embodiment. The information system A includes two or more service servers 1, a management server 2, an external server 3, and two or more terminal apparatuses 4.

The service servers 1 are servers that each provide a service to the terminal apparatuses 4. There is no limitation on the type of service that is provided by the service servers 1. The service is a game, for example. That is to say, users of the terminals apparatus can play a game using the service servers 1 and the management server 2. Note that the service that is provided by the service servers 1 to the terminal apparatuses 4 is not limited to a game. The service that is provided by the service servers 1 to the terminal apparatuses 4 may be information display services using augmented reality (AR) or virtual reality (VR) (augmented reality), chatting, or videoconferencing, for example, and there is no limitation on the content thereof.

The management server 2 is a server that manages the status of each of the two or more service servers 1. The management server 2 receives status information from each of the two or more service servers 1, and transmits, to each of the service servers 1, status information of another service server 1. The status information that is transmitted by the management server 2 may be a status information group, which is the status information of all service servers 1.

The external server 3 is a server that receives status information of each of the two or more service servers 1 and transmits a down instruction and a startup instruction to the service servers 1. The status information that is received by the management server 2 and the status information that is received by the external server 3 do not have to be the same type of information.

The terminal apparatuses 4 are terminals that are provided with a service. The terminal apparatuses 4 are typically terminals that are provided with a service from the service servers 1.

The service servers 1, the management server 2, and the external server 3 are ASP servers, cloud servers or the like, for example. Note that there is no limitation on the type of the service servers 1, the management server 2, and the external server 3.

The terminal apparatuses 4 are so-called personal computers, tablet terminals, smartphones, or the like, for example, and there is no limitation on the type thereof.

The two or more service servers 1, the management server 2, the external server 3, and the two or more terminal apparatuses 4 can typically communicate with each other via the Internet, a LAN or other networks.

Figure 2:
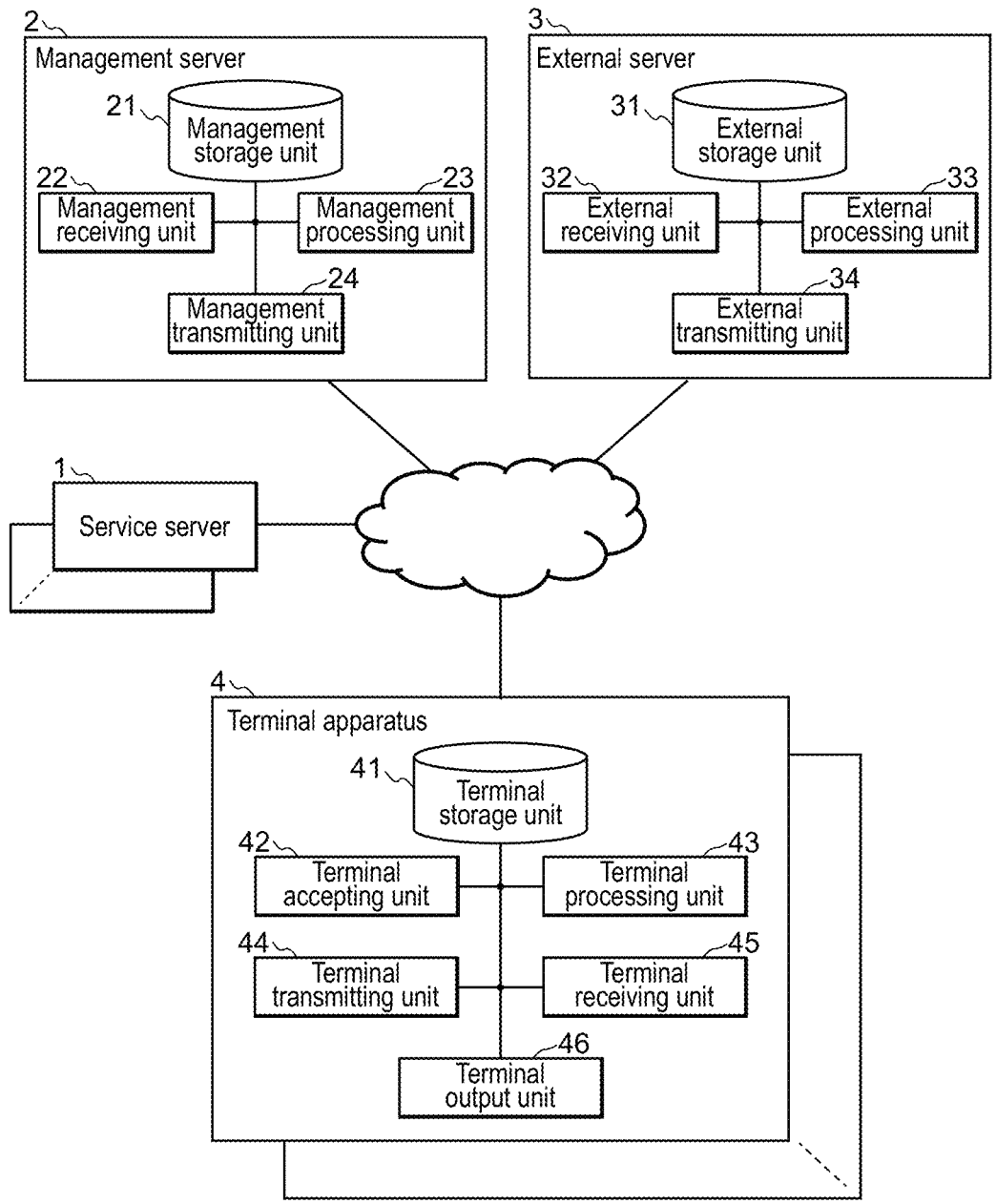
FIG. 2 is a block diagram of the information system A in the embodiment.
Figure 3:
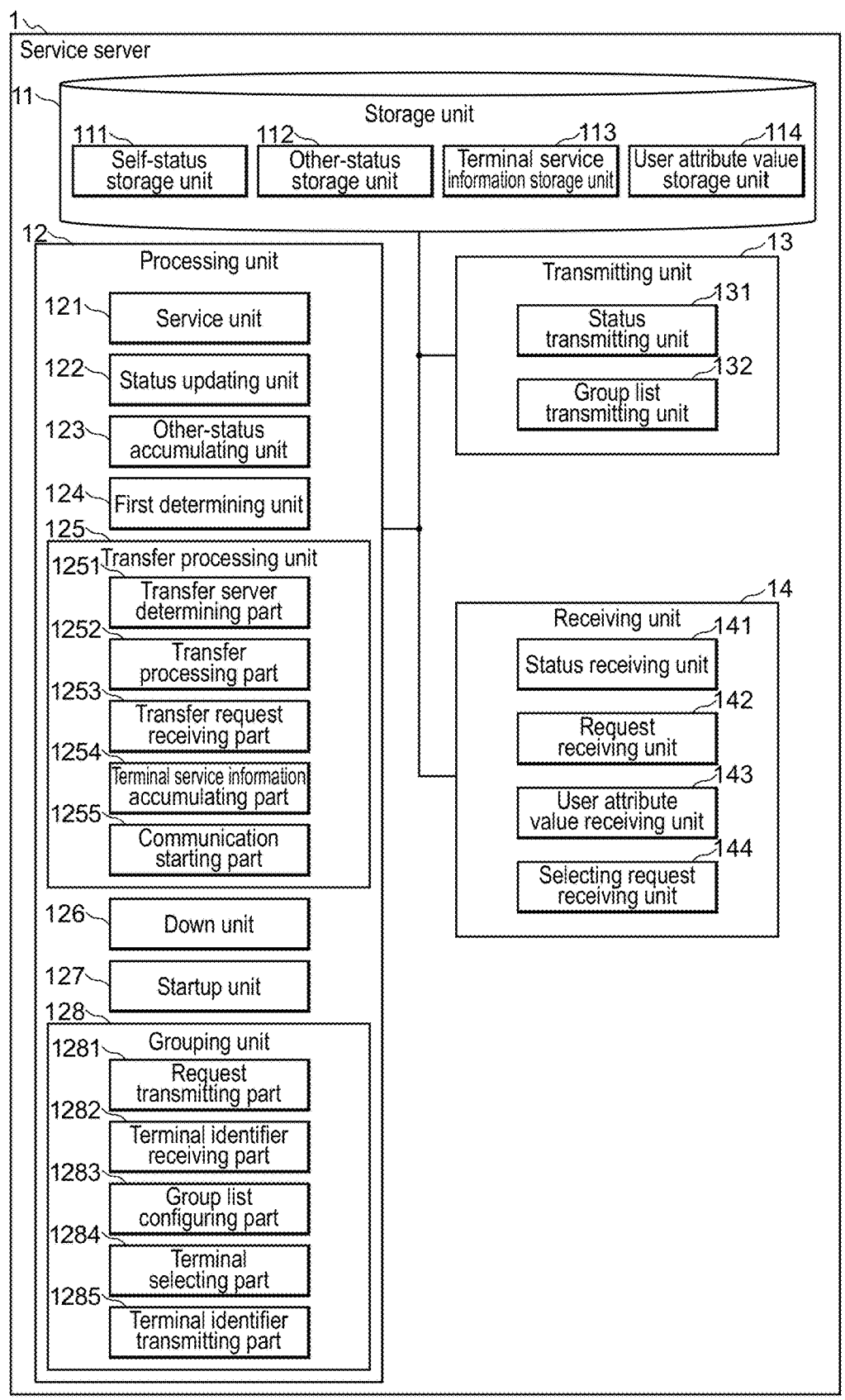
FIG. 3 is a block diagram of a service server 1 constituting the information system A in the embodiment.

FIG. 2 is a block diagram of the information system A in this embodiment. FIG. 3 is a block diagram of a service server 1 constituting the information system A.

The service server 1 includes a storage unit 11, a processing unit 12, a transmitting unit 13, and a receiving unit 14. The storage unit 11 includes a self-status storage unit 111, an other-status storage unit 112, a terminal service information storage unit 113, and a user attribute value storage unit 114, for example.

The processing unit 12 includes a service unit 121, a status updating unit 122, an other-status accumulating unit 123, a first determining unit 124, a transfer processing unit 125, a down unit 126, a startup unit 127, and a grouping unit 128, for example. The transfer processing unit 125 includes a transfer server determining part 1251, a transfer processing part 1252, a transfer request receiving part 1253, a terminal service information accumulating part 1254, and a communication starting part 1255, for example. The grouping unit 128 includes a request transmitting part 1281, a terminal identifier receiving part 1282, a group list configuring part 1283, a terminal selecting part 1284, and a terminal identifier transmitting part 1285, for example. The transmitting unit 13 includes a status transmitting unit 131 and a group list transmitting unit 132, for example. The receiving unit 14 includes a status receiving unit 141, a request receiving unit 142, a user attribute value receiving unit 143, and a selecting request receiving unit 144, for example.

The management server 2 includes a management storage unit 21, a management receiving unit 22, a management processing unit 23, and a management transmitting unit 24.

The external server 3 includes an external storage unit 31, an external receiving unit 32, an external processing unit 33, and an external transmitting unit 34.

The terminal apparatuses 4 each include a terminal storage unit 41, a terminal accepting unit 42, a terminal processing unit 43, a terminal transmitting unit 44, a terminal receiving unit 45, and a terminal output unit 46.

Various types of information are stored in the storage unit 11 constituting the service server 1. The various types of information are, for example, later-described status information, later-described terminal service information, a later-described user attribute value, a later-described attribute value condition, a service server identifier of the service server, and one or more other service server identifiers.

The service server identifiers are information for identifying a service server 1. The service server identifiers are IDs, IP addresses, or MAC addresses, for example. Note that the service server identifiers may be any information with which a service server 1 can be identified.

Self-status information is stored in the self-status storage unit 111. The status information is information regarding the status of the service server 1. The self-status information is status information of the service server 1 itself.

The status is one or two of two types of statuses including static status, which is information that does not constantly change, and dynamic status, which can generally constantly change. That is to say, the status information is static status information, dynamic status information, or static status information and dynamic status information.

Examples of the static status information include processing target information and processing capability information. The processing target information is information for specifying a service that the service server 1 can provide. The processing target information may be considered to be information for specifying the range of services that the service server 1 can handle. The processing target information is a command identifier for identifying a command that can be processed, a room identifier for identifying a room of a game to which the service can be provided, or a stage identifier for identifying a stage of a game to which the service can be provided, for example. The processing capability information is information for specifying a processing capability of the service server 1. The processing capability information is the maximum number of terminal apparatuses 4 to which a service can be provided, or information indicating processor capability (e.g., number of CPU clocks and number of cores), for example. The static status information is information received by the receiving unit 14 from the terminal apparatus 4 of a system administrator and accumulated by the processing unit 12.

Examples of the dynamic status information include load information. The load information is information regarding a load of the service server 1. The load information is the number of terminals, processor utilization rate (e.g., CPU utilization rate), or load level, for example. The number of terminals is the number of terminal apparatuses 4 to which a service is being provided by the service server 1.

One or at least two pieces of other-status information are stored in the other-status storage unit 112. The other-status information is status information of another service server 1. Typically, the self-status information and the other-status information are the same type of information. The other-status information is typically associated with another service server identifier of another service server 1.

Terminal service information of the one or more terminal apparatuses 4 is stored in the terminal service information storage unit 113. The terminal service information is typically associated with a terminal identifier for identifying a terminal apparatus 4. The one or more terminal apparatuses 4 are terminal apparatuses to which a service is being provided by the service unit 121. The terminal identifier is information for identifying a terminal apparatus 4. The terminal identifier may be a user identifier for identifying a user who uses a terminal apparatus 4. The terminal identifier is an ID, an IP address, a MAC address, a telephone number, a user ID, or an e-mail address, for example.

The terminal service information is information regarding the terminal apparatuses 4 to which a service is being provided. The terminal service information is information regarding the statuses of the terminal apparatuses 4 to which a service is being provided by the service unit 121. The terminal service information is information regarding the status of a game in progress, for example. The terminal service information is information to enable resumption of the game, for example. The terminal service information is information for specifying information or a scene being output in VR, for example. The terminal service information is information for specifying information or a scene being output in AR, for example. The terminal service information contains a terminal identifier for identifying the other terminal apparatus 4 in the chat and the content of the chat so far, for example.

One or more user attribute values of each of one or more users are stored in the user attribute value storage unit 114. The one or more users are users who use the one or more terminal apparatuses 4. The one or more user attribute values are associated with the terminal identifiers. The one or more terminal apparatuses 4 are terminal apparatuses to which a service is being provided by the service unit 121. The user attribute values are attribute values of users. The user attribute values are the user's game level, name, gender, age, or the identifier of the organization to which the user belongs (e.g., company name, company ID), for example. The user attribute values may be any information regarding a user.

The processing unit 12 performs various types of processing. The various types of processing are processing that is performed by the service unit 121, the status updating unit 122, the other-status accumulating unit 123, the first determining unit 124, the transfer processing unit 125, the down unit 126, the startup unit 127, and the grouping unit 128, for example.

The processing unit 12 determines whether or not a later-described second condition is satisfied, for example. The processing unit 12 determines whether or not a later-described third condition is satisfied, for example.

The processing unit 12 accumulates received one or more user attribute values in the user attribute value storage unit 114 in association with a terminal identifier, for example. The one or more user attribute values are received by the user attribute value receiving unit 143, for example. The one or more user attribute values are contained in a received request, for example.

The service unit 121 provides a service to one or more terminal apparatuses 4. As described above, there is no limitation on the content of the service. The service is a game, VR, or AR, for example.

The service unit 121 typically provides a service to one or more terminal apparatuses 4, acquires terminal service information containing a result of providing the service, and accumulates the terminal service information in the terminal service information storage unit 113 each in a pair with a terminal identifier. The content, the data structure, and the like of the terminal service information typically vary depending on the service. The processing in which the service unit 121 provides a service and acquires terminal service information can be realized by various known techniques.

The providing a service is performing processing on a request received from the terminal apparatuses 4, for example. The results of such processing are transmitted to the terminal apparatuses 4, for example.

The status updating unit 122 acquires the self-status information of the service server 1, and accumulates it in the self-status storage unit 111. The status updating unit 122 constantly acquires self-status information, and accumulates it in the self-status storage unit 111, for example. The status updating unit 122 periodically acquires status information, and accumulates it in the self-status storage unit 111, for example. There is no limitation on the time at which the status updating unit 122 updates the status information. The periodically acquiring information may be considered to include constantly acquiring information. The periodically acquiring information means that it is sufficient if the information is acquired generally periodically, and the intervals of acquiring information may be slightly different.

The status updating unit 122 acquires the number of terminals, which is the number of terminal apparatuses 4 to which a service is being provided, for example. The status updating unit 122 acquires the utilization rate of a processor, for example. Techniques for acquiring the number of terminals and processor utilization rate are known techniques, and thus a detailed description thereof has been omitted.

As a result of the update processing performed by the status updating unit 122, the latest status information of the service server is typically stored in the self-status storage unit 111.

The other-status accumulating unit 123 accumulates the one or at least two pieces of other-status information received by the status receiving unit 141, in the other-status storage unit 112. The other-status accumulating unit 123 accumulates the one or more pieces of status information received by the status receiving unit 141, in the other-status storage unit 112, each in association with a service server identifier. The other-status accumulating unit 123 typically accumulates all pieces of status information received by the status receiving unit 141, in the other-status storage unit 112. The self-status information may be contained in all pieces of status information.

As a result of the processing of the other-status accumulating unit 123, the latest status information of one or more other service servers 1 is typically stored in the other-status storage unit 112 each in association with a service server identifier.

The first determining unit 124 determines whether or not the self-status information satisfies a first condition. The first determining unit 124 determines whether or not the first condition is satisfied, using only the self-status information, for example.

The first condition is a condition for performing transfer that enables the terminal apparatuses 4 that transmitted a request to receive a service from another service server 1. The first condition is a condition for performing transfer that enables the terminal apparatuses 4 to which a service is being provided or the terminal apparatus 4 that newly accessed the service server to receive a service from another service server 1.

The first determining unit 124 determines whether or not the number of terminals contained in the self-status information satisfies the first condition, for example. In this case, the first condition is "the number of terminals is less than or equal to a threshold value", "the number of terminals is less than a threshold value", "the ratio of the number of terminals out of the number of terminal apparatuses 4 that are being handled by all service servers 1 (hereinafter referred to appropriately as "the total number of terminals") is less than or equal to a threshold value", "the ratio of the number of terminals out of the total number of terminals is less than a threshold value", or "the number of terminals is large (e.g., the same as or more than the number of terminals that the service server can handle, etc.) enough to meet a predetermined condition", for example.

The first determining unit 124 determines whether or not the first condition is satisfied, using the self-status information and the received request, for example. The first determining unit 124 refers to the self-status information, and determines whether or not the request satisfies the first condition, for example.

The first determining unit 124 determines whether or not processing target information contained in the request is contained in processing target information contained in the self-status information (whether or not the service unit 121 can provide a service corresponding to the request), for example. In this case, the first condition is that "the processing target information contained in the request is not contained in the processing target information contained in the self-status information". For example, when a game progresses and reaches the next stage, the first determining unit 124 determines that the processing target information contained in the request transmitted from the terminal apparatus 4 is not contained the processing target information contained in the self-status information.

The first determining unit 124 determines that the processing of the current stage in the service that is being provided (e.g., a game) has been completed, for example. In this case, the first condition is that the processing of one stage is completed, or that it is necessary to move to another room in the game, for example. In this case, information for determining the processing of the stage of the service (e.g., game) is stored in the storage unit 11, for example.

The transfer processing unit 125 performs transfer processing. The transfer processing is processing for enabling any one or more terminal apparatuses to which a service is being provided by the service unit 121 to receive a service from another service server. The transfer processing is processing for enabling any one or more terminal apparatuses 4 to which a service is being provided by the service unit 121 to receive a service from the other service server 1 determined by the transfer server determining part 1251, for example.

The transfer processing is processing for acquiring terminal service information corresponding to the terminal identifier of a terminal apparatus 4 subjected to transfer, from the terminal service information storage unit 113, and transmitting the terminal service information to a service server 1 serving as a transfer destination, for example. The transfer processing further includes processing for disconnecting communication with the terminal apparatus 4 subjected to transfer, for example. The processing for transmitting the terminal service information to the service server 1 serving as a transfer destination is processing for referring to another service server identifier acquired by the transfer server determining part 1251 and transmitting the information to the service server 1 identified with the service server identifier.

The transfer server determining part 1251 determines a service server 1 serving as a transfer destination, using the one or more pieces of other-status information. The service server 1 serving as a transfer destination is the service server 1 that is to provide a service to the terminal apparatuses 4.

The transfer server determining part 1251 determines another service server 1 from which any one or more terminal apparatuses 4, out of the one or more terminal apparatuses 4 to which a service is being provided by the service unit 121, are to receive a service, using the one or more pieces of other-status information, for example.

The transfer server determining part 1251 determines another service server 1 from which the terminal apparatus 4 whose access has been started is to receive a service, using the one or more pieces of other-status information, for example. The terminal apparatus 4 whose access has been started is typically the terminal apparatus 4 that transmitted the first request in a series of one or more requests.

The transfer server determining part 1251 typically determines another service server 1 from which the terminal apparatuses 4 are to receive a service, in the case in which the first determining unit 124 determines that the first condition is satisfied.

The determined another service server 1 is the service server 1 that can handle a request from the terminal apparatuses 4, for example. The transfer server determining part 1251 determines a service server 1 that can provide a service corresponding to processing target information contained in the received request, as the service server 1 serving as a transfer destination, for example. The transfer server determining part 1251 detects other-status information containing the processing target information corresponding to processing target information contained in the received request, from the other-status storage unit 112, and acquires another service server identifier that is paired with the other-status information, for example.

The transfer server determining part 1251 determines, as the service server 1 serving as a transfer destination, the service server 1 corresponding to the other-status information with the lowest load indicated by the load information, out of the service servers 1 that can provide a service corresponding to processing target information contained in the received request, for example.

The transfer processing part 1252 performs transfer processing for enabling any one or more terminal apparatuses to which a service is being provided by the service unit 121 to receive a service from the other service server 1 determined by the transfer server determining part 1251.

The transfer processing part 1252 acquires a terminal identifier of the terminal apparatus 4 subjected to transfer, for example. The transfer processing part 1252 acquires terminal service information that is paired with the terminal identifier, from the terminal service information storage unit 113. Next, the transfer processing part 1252 configures a transfer request in which the terminal identifier and the terminal service information are associated with each other. Next, the transfer processing part 1252 transmits the transfer request to the other service server 1 determined by the transfer server determining part 1251. Next, the transfer processing part 1252 disconnects communication with the terminal apparatus 4.

The transfer request receiving part 1253 receives a transfer request. The transfer request receiving part 1253 receives a transfer request transmitted from another service server 1.

The terminal service information accumulating part 1254 accumulates the terminal service information contained in the transfer request received by the transfer request receiving part 1253, in the terminal service information storage unit 113, in a pair with the terminal identifier contained in the transfer request.

The communication starting part 1255 starts communication with the terminal apparatus 4 identified with the terminal identifier contained in the transfer request. Subsequently, the request receiving unit 142 can receive the request from the terminal apparatus 4.

The down unit 126 performs down processing in the case in which a second condition is satisfied. The processing is processing for causing the service server 1 to go down. The down processing is processing for shutting down the service server 1, for example. The down processing is processing for putting the service server 1 into a sleep state, for example. The sleep state is a state in which the service server can be started up by accepting a startup signal.

The second condition is that a down instruction is received from an external apparatus, for example. The down instruction is an instruction to go down. The external apparatus is the external server 3, for example. The external apparatus may be another service server 1 or the management server 2, for example.

The second condition is a condition regarding the self-status information, for example. The second condition is that the load of the load information contained in the self-status information is low enough to satisfy a predetermined condition, for example. The second condition is, for example, the number or the ratio of terminal apparatuses 4 to which a service is being provided is small enough to satisfy a predetermined condition. The second condition is that the number of terminal apparatuses 4 to which a service is being provided is "0", for example.

The down unit 126 preferably performs the down processing after the transfer processing unit 125 has completed the transfer processing on all terminal apparatuses 4 to which a service is being provided by the service unit 121.

The processing unit 12 may include a second determining unit (not shown) that determines whether or not the second condition is satisfied.

The startup unit 127 performs startup processing for starting up the service server 1 that is inactive, in the case in which a third condition is satisfied. The startup processing is to bring the service server from a sleep state to a state in which it can provide normal service, for example.

The third condition is that a startup instruction is received from an external apparatus, for example. The external apparatus is the external server 3, for example. The external apparatus may be another service server 1 or the management server 2, for example. The service server 1 that is inactive is the service server in focus. The startup processing is processing for starting up the service server 1. The startup processing may be processing for bringing the service server from a sleep state to a state in which it can provide normal service.

The processing unit 12 may include a third determining unit (not shown) that determines whether or not the third condition is satisfied.

The grouping unit 128 acquires two or more terminal identifiers for identifying the terminal apparatuses 4 that satisfy an attribute value condition, thereby acquiring a group list having the two or more terminal identifiers. The attribute value condition is a condition for the one or more user attribute values received by the user attribute value receiving unit 143. The attribute value condition is a condition using the one or more user attribute values received by the user attribute value receiving unit 143, for example. For example, if the one or more user attribute values received by the user attribute value receiving unit 143 indicate the level of the user's game, the attribute value condition is that "the level matches" or "the level is close enough to satisfy a predetermined condition", for example. "The level is close enough to satisfy a predetermined condition" is that "the difference in levels is less than or equal to a threshold value", "the difference in levels is less than a threshold value", or "the difference in levels is within the top N players (the level is high enough to have almost no difference)", for example.

The grouping unit 128 realizes the above-described processing through the processing by the request transmitting part 1281, the terminal identifier receiving part 1282, and the group list configuring part 1283, for example.

The request transmitting part 1281 transmits a terminal selecting request to one or more other service servers 1. The terminal selecting request is a request to select a user who makes a group with the user corresponding to the one or more user attribute values received by the user attribute value receiving unit 143. The user is selected by selecting a terminal apparatus 4. The terminal selecting request contains the one or more user attribute values received by the user attribute value receiving unit 143. The terminal selecting request is a command transmitted a terminal apparatus 4, for example.

The terminal identifier receiving part 1282 receives terminal identifiers of one or more terminal apparatuses 4 that satisfy the attribute value condition, in response to transmission of the terminal selecting request. The terminal selecting request may be an example of the request transmitted a terminal apparatus 4, or may be transmitted from another service server 1.

The group list configuring part 1283 configures a group list containing terminal identifiers respectively corresponding to two or more users who make a group with the user corresponding to the one or more user attribute values received by the user attribute value receiving unit 143.

The group list configuring part 1283 configures a group list containing the one or more terminal identifiers received by the terminal identifier receiving part 1282, for example.

The group list configuring part 1283 selects a user who makes a group with the user corresponding to the one or more user attribute values received by the user attribute value receiving unit 143, out of the one or more users corresponding to the terminal apparatuses 4 to which a service is being provided by the service unit 121, and acquires a terminal identifier corresponding to the selected user, for example. The group list configuring part 1283 acquires a terminal identifier for identifying the terminal apparatus 4 to which a service is being provided by the service unit 121, acquires one or more user attribute values that are paired with the terminal identifier, from the user attribute value storage unit 114, and acquires the terminal identifier as information constituting the group list, in the case in which the one or more user attribute values satisfy the attribute value condition, for example.

The group list configuring part 1283 may configure a group list containing only a terminal identifier corresponding to a user corresponding to the one or more user attribute values received by the user attribute value receiving unit 143 and terminal identifiers respectively corresponding to one or more users selected by the service server.

The group list configuring part 1283 may configure a group list containing terminal identifiers respectively corresponding to one or more users selected by the service server and one or more terminal identifiers received by the terminal identifier receiving part 1282.

The terminal selecting part 1284 selects one or more terminal apparatuses 4 corresponding to a user attribute value that matches the terminal selecting request received by the selecting request receiving unit 144, which will be described later, out of the terminal apparatuses 4 to which a service is being provided by the service unit 121, and acquires terminal identifiers for respectively identifying the one or more terminal apparatuses 4. The terminal selecting part 1284 determines whether or not one or more user attribute values that are paired with a terminal identifier of a terminal apparatus 4 to which a service is being provided by the service unit 121 satisfy an attribute value condition based on one or more user attribute values contained in the terminal selecting request, and acquires a terminal identifier that is paired with one or more user attribute values that satisfy the attribute value condition, for example.

The terminal identifier transmitting part 1285 transmits the one or more terminal identifiers acquired by the terminal selecting part 1284, to the service server 1 that transmitted the terminal selecting request.

The transmitting unit 13 transmits various types of information. The various types of information are self-status information, a group list, and a processing result of the service unit 121, for example.

The status transmitting unit 131 transmits self-status information to the management server 2. The status transmitting unit 131 preferably transmits self-status information generally periodically to the management server 2. There is no limitation on the time at which the status transmitting unit 131 transmits self-status information to the management server 2. The term "generally periodically" means that a slight difference in the transmission interval is acceptable. The term "generally periodically" may mean "constantly".

The status transmitting unit 131 preferably acquires latest self-status information from the self-status storage unit 111, and transmits the status information to the management server 2.

The status transmitting unit 131 preferably further transmits specifying information to the management server 2. The specifying information is information for specifying a version of latest one or more pieces of other-status information received by the status receiving unit 141. The specifying information is a hash value generated from latest one or more pieces of other-status information, or latest one or more pieces of other-status information and latest self-status information, for example. The specifying information is information obtained by encrypting latest one or more pieces of other-status information, or latest one or more pieces of other-status information and latest self-status information, for example. Note that the specifying information may be any information with which a version of latest one or more pieces of other-status information can be specified, and there is no limitation on the data structure and the like thereof.

The status transmitting unit 131 preferably transmits self-status information and specifying information together, but may be transmit them separately.

The group list transmitting unit 132 transmits a group list to a terminal apparatus 4. The group list transmitting unit 132 typically transmits the group list configured by the group list configuring part 1283, to the terminal apparatus 4 that transmitted a group list request.

The receiving unit 14 receives various types of information. The various types of information are other-status information, a request, a user attribute value, and a selecting request, for example.

The status receiving unit 141 receives a status information group containing one or more pieces of other-status information from the management server 2. The status receiving unit 141 may receive status information of all of the two or more service server 1 from the management server 2. The status information of all service servers 1 contains self-status information. The status information that is received by the status receiving unit 141 is associated with a service server identifier.

The request receiving unit 142 receives a request from the terminal apparatuses 4. The request is a request to provide a service. The request that is received by the request receiving unit 142 is associated with a terminal identifier. The content, the data structure, and the like of the request may be of various types, and there is no limitation thereon.

The user attribute value receiving unit 143 receives one or more user attribute values from a terminal apparatus 4. The user attribute value receiving unit 143 typically receives one or more user attribute values associated with a terminal identifier.

The selecting request receiving unit 144 receives a terminal selecting request from another service server 1. The terminal selecting request typically contains one or more user attribute values.

Various types of information are stored in the management storage unit 21 constituting the management server 2. The various types of information are a status information group having status information of two or more service servers 1, for example. Each of the two or more pieces of status information is associated with a service server identifier for identifying a service server 1. The various types of information are specifying information. The specifying information is associated with a latest status information group. The latest status information group contains status information of each of the two or more service servers 1.

The management receiving unit 22 receives self-status information from each of the two or more service servers 1. The management receiving unit 22 preferably further receives specifying information from each service server 1. The management receiving unit 22 receives status information or specifying information from the service server 1, in association with the service server identifier of the service server 1.

The management processing unit 23 performs various types of processing. The various types of processing are processing for accumulating the status information received by the management receiving unit 22, in the management storage unit 21, for example. The management processing unit 23 accumulates the status information received by the management receiving unit 22, in the management storage unit 21, in association with the service server identifier, for example.

The management processing unit 23 preferably configures specifying information using the status information of the two or more service servers 1, and accumulates the two or more pieces of status information in the management storage unit 21 in association with the specifying information. The management processing unit 23 acquires specifying information using the two or more pieces of status information, for example. The management processing unit 23 gives the two or more pieces of status information to a hash function and acquires specifying information as a hash value, for example. The management processing unit 23 encrypts the two or more pieces of status information, thereby acquiring specifying information, for example.

The management processing unit 23 may determine whether or not the specifying information received from the service server 1 has a predetermined relationship with the specifying information stored in the management storage unit 21. This determining processing is referred to as specifying information determination. The predetermined relationship is that these pieces of specifying information match each other, or that the value output by giving one of these pieces of specifying information to a predetermined function matches the other piece of specifying information, for example.

The management transmitting unit 24 transmits, to each of the two or more service servers, one or more pieces of other-status information at least that are not status information of a service server 1 to which the other-status information is to be transmitted, out of the two or more pieces of self-status information received by the management receiving unit 22.

The management transmitting unit 24 preferably transmits all of the two or more pieces of status information received by the management receiving unit 22, to each of the two or more service servers.

The management transmitting unit 24 transmits latest two or more pieces of status information to the service server 1 that transmitted the specifying information, in the case in which the specifying information received from the service server 1 does not have a predetermined relationship with the specifying information stored in the management storage unit 21, for example.

The management transmitting unit 24 preferably transmits one or more pieces of other-status information to each of the two or more service servers 1, in a case in which the version indicated by the specifying information received by the management receiving unit 22 does not match the version corresponding to the latest two or more pieces of status information received by the management receiving unit 22.

The management transmitting unit 24 preferably transmits all of the two or more pieces of self-status information received by the management receiving unit 22, to each of the two or more service servers 1.

The management transmitting unit 24 preferably transmits one or more pieces of status information generally periodically to each of the two or more service servers 1.

The management transmitting unit 24 preferably transmits one or more pieces of status information, in response to a request from the service server 1.

The management transmitting unit 24 preferably transmits one or more pieces of status information, in response to a request from the service server 1, in the case in which the management processing unit 23 determines that there is no predetermined relationship as a result of the specifying information determination performed by the management processing unit 23.

In the case in which the management processing unit 23 determines that the specifying information received from the service server 1 does not have a predetermined relationship with the specifying information stored in the management storage unit 21, the management transmitting unit 24 preferably transmits one or more pieces of other-status information to the service server 1.

Various types of information are stored in the external storage unit 31 constituting the external server 3. The various types of information are load information of each of the two or more service servers 1, for example. The load information is preferably associated with a service server identifier.

The external receiving unit 32 receives load information from each of the two or more service servers 1. The external receiving unit 32 receives load information associated with a service server identifier.

The external processing unit 33 performs various types of processing. The various types of processing are processing for accumulating the load information received by the external receiving unit 32, in the external storage unit 31, in association with the service server identifier, for example. The various types of processing are processing for determining whether or not to transmit a startup instruction to the service server 1 that is inactive, using one or more pieces of load information in the external storage unit 31, for example. The various types of processing are processing for determining whether or not to transmit a down instruction to the service server 1, using one or more pieces of load information in the external storage unit 31, for example.

The external processing unit 33 determines whether or not the load information satisfies a predetermined second condition (e.g., "the number of terminals to which a service is being provided is less than or equal to a threshold value"), and acquires a service server identifier that is paired with the load information that satisfies the second condition, as information on the service server to which the down instruction is to be transmitted.

The external processing unit 33 determines whether or not the load information of one or at least two service servers 1 satisfies a predetermined third condition (e.g., "the total load amount is large enough to satisfy a predetermined condition"), and acquires a service server identifier that is paired with the load information indicating that the service server is down, as information on the service server to which the startup instruction is to be transmitted, in the case in which the third condition is satisfied, for example.

The external transmitting unit 34 transmits a down instruction to the service server 1 that is determined by the external processing unit 33 as the service server to which the down instruction is to be transmitted, for example. The external transmitting unit 34 transmits a startup instruction to the service server 1 that is determined by the external processing unit 33 as the service server to which the startup instruction is to be transmitted, for example.

The external transmitting unit 34 transmits the down instruction to the service server 1 identified with the service server identifier acquired as information on the service server to which the down instruction is to be transmitted, for example.

The external transmitting unit 34 transmits a startup instruction to the service server 1 identified with the service server identifier acquired by the external processing unit 33 as information on the service server to which the startup instruction is to be transmitted, for example.

Various types of information are stored in the terminal storage unit 41 constituting the terminal apparatuses 4. The various types of information are a terminal identifier and one or more user attribute values, for example.

The terminal accepting unit 42 accepts various types of instructions and information. The various types of instructions and information are various types of requests and terminal selecting requests, for example. The terminal selecting request may also be considered to be an example of the request.

The various types of instructions and information may be input by any device such as a touch panel, a game controller, a keyboard, a mouse, or a menu screen.

The terminal processing unit 43 performs various types of processing. The various types of processing are processing for configuring an instruction or information that is to be transmitted, from the various types of instructions and information accepted by the terminal accepting unit 42, for example. The various types of processing are processing for configuring information that is to be transmitted, from the information received by the terminal receiving unit 45. The various types of processing are processing for configuring a request associated with the terminal identifier, using the request accepted by the terminal accepting unit 42 and the terminal identifier in the terminal storage unit 41, for example.

The terminal transmitting unit 44 transmits the various types of instructions and information to the service server 1. The various types of instructions and information are a request associated with a terminal identifier, for example.

The terminal receiving unit 45 receives various types of information from the service server 1. The various types of information are a result of processing on a request and a group list, for example.

The terminal output unit 46 outputs various types of information. The various types of information are a result of processing on a request and a group list, for example.

In this example, the output is a concept that encompasses display on a display screen, projection using a projector, printing by a printer, output of a sound, transmission to an external apparatus, accumulation in a recording medium, delivery of a processing result to another processing apparatus or another program, and the like.

The storage unit 11, the self-status storage unit 111, the other-status storage unit 112, the terminal service information storage unit 113, the user attribute value storage unit 114, the management storage unit 21, the external storage unit 31, and the terminal storage unit 41 are preferably non-volatile recording media, but can be realized by volatile recording media.

There is no limitation on the procedure in which such information is stored in the storage unit 11 and the like. For example, the information may be stored in the storage unit 11 and the like via a recording medium, the information transmitted via a communication line or the like may be stored in the storage unit 11 and the like, or the information input via an input device may be stored in the storage unit 11 and the like.

The processing unit 12, the service unit 121, the status updating unit 122, the other-status accumulating unit 123, the first determining unit 124, the transfer server determining part 1251, the transfer processing unit 125, the down unit 126, the startup unit 127, the grouping unit 128, the group list configuring part 1283, the terminal selecting part 1284, the management processing unit 23, the external processing unit 33, and the terminal processing unit 43 may be realized typically by processors, memories, or the like. Typically, the processing procedure of the processing unit 12 and the like is realized by software, and the software is stored in a recording medium such as a ROM. Note that the processing procedure may be realized by hardware (a dedicated circuit). The processors are CPUs, MPUs, or GPUs, for example, but there is no limitation on the type thereof.

The request transmitting part 1281, the terminal identifier transmitting part 1285, the transmitting unit 13, the status transmitting unit 131, the group list transmitting unit 132, the management transmitting unit 24, the external transmitting unit 34, and the terminal transmitting unit 44 are typically realized by wireless or wired communication parts, but may be realized by broadcasting parts.

The terminal identifier receiving part 1282, the receiving unit 14, the status receiving unit 141, the request receiving unit 142, the user attribute value receiving unit 143, the selecting request receiving unit 144, the management receiving unit 22, the external receiving unit 32, and the terminal receiving unit 45 are typically realized by wireless or wired communication parts, but may be realized by broadcast receiving parts.

The terminal accepting unit 42 may be realized by a device driver for an input device such as a touch panel, a game controller, or a keyboard, control software for a menu screen, or the like.

The terminal output unit 46 may be considered to include or to not include an output device such as a display screen or a speaker. The terminal output unit 46 may be realized by driver software for an output device, a combination of driver software for an output device and the output device, or the like.

Next, an operation example of the information system A will be described. First, an operation example of the service server 1 will be described with reference to the flowchart in FIG. 4.

(Step S401) The request receiving unit 142 determines whether or not it has received a request in association with a terminal identifier from a terminal apparatus 4. If it has received a request, the procedure advances to step S402, or otherwise the procedure advances to step S414.

(Step S402) The processing unit 12 determines whether or not the request received in step S401 is a terminal selecting request. If it is a terminal selecting request, the procedure advances to step S412, or otherwise the procedure advances to step S403.

(Step S403) The first determining unit 124 performs first determining processing for determining whether or not to perform transfer that enables the terminal apparatus 4 that transmitted the request to receive a service from another service server 1. An example of the first determining processing will be described with reference to the flowchart in FIG. 5.

(Step S404) If the result of the first determination is "perform transfer", the procedure advances to step S411, or otherwise the procedure advances to step S405.

(Step S405) The service unit 121 performs processing on the request received in step S401. Typically, a result of the processing on the request is transmitted to the terminal apparatus 4.

(Step S406) The service unit 121 acquires terminal service information containing a result of the processing in step S405, and accumulates the terminal service information in the terminal service information storage unit 113 in association with the terminal identifier corresponding to the received request.

(Step S407) The processing unit 12 determines whether or not the request received in step S401 contains one or more user attribute values of the user of the terminal apparatus 4 that transmitted the request. If the request contains one or more user attribute values, the procedure advances to step S408, or otherwise the procedure advances to step S409.

(Step S408) The processing unit 12 accumulates the one or more user attribute values contained in the request, in the user attribute value storage unit 114, in association with the terminal identifier corresponding to the request received in step S401.

(Step S409) The status updating unit 122 acquires status information of the service server 1. The status information that is acquired in this example is typically dynamic status information.

(Step S410) The status updating unit 122 accumulates the status information acquired in step S409, in the self-status storage unit 111, thereby updating the self-status information. The procedure returns to step S401.

(Step S411) The transfer processing unit 125 and the like perform transfer processing. The procedure returns to step S401. An example of the transfer processing will be described with reference to the flowchart in FIG. 6.

(Step S412) The grouping unit 128 performs processing for configuring a group list. An example of the list configuring processing will be described with reference to the flowchart in FIG. 7.

(Step S413) The terminal identifier transmitting part 1285 transmits the group list configured in step S412, to the terminal apparatus 4 that transmitted the request. The procedure returns to step S401.

(Step S414) The processing unit 12 determines whether or not it is time to request to transmit a status information group containing status information of one or more other service servers 1. If it is time to request to transmit a status information group, the procedure advances to step S415, or otherwise the procedure advances to step S419. The time to request to transmit a status information group is periodically, constantly, or the like, for example. It is also possible that the determining processing in step S414 is not performed and transmission of a status information group is constantly requested.

(Step S415) The processing unit 12 acquires specifying information corresponding to the current latest status information group stored in the other-status storage unit 112. The specifying information may be stored in the other-status storage unit 112 in association with the current latest status information group or acquired using the current latest status information group immediately before the transmission.

(Step S416) The transmitting unit 13 transmits the specifying information acquired in step S415, to the management server 2. The transmission of such specifying information is a request for a status information group.

(Step S417) The status receiving unit 141 determines whether or not it has received a status information group from the management server 2. If it has received a status information group, the procedure advances to step S418, or otherwise the procedure returns to step S401. The case in which it has not received a status information group is the case in which no status information group has been received after a predetermined timeout period has past, for example.

(Step S418) The other-status accumulating unit 123 accumulates the status information group received in step S417, in the other-status storage unit 112. The procedure returns to step S401.

Each piece of status information constituting the status information group received in step S417 is associated with a service server identifier for identifying a service server 1 corresponding to the status information. That is to say, the other-status accumulating unit 123 accumulates each piece of status information constituting the status information group received in step S417, in the other-status storage unit 112, in association with a service server identifier.

Furthermore, the other-status accumulating unit 123 preferably acquires specifying information using the status information group received in step S417, and accumulates the status information group in the other-status storage unit 112 in a pair with the specifying information.

(Step S419) The user attribute value receiving unit 143 determines whether or not it has received one or more user attribute values from a terminal apparatus 4. If it has received one or more user attribute values, the procedure advances to step S420, or otherwise the procedure advances to step S421. The user attribute value receiving unit 143 typically receives one or more user attribute values corresponding to a terminal identifier. The terminal apparatus 4 that transmitted the one or more user attribute values is typically the terminal apparatus 4 to which a service is being provided by the service unit 121.

(Step S420) The processing unit 12 accumulates the one or more user attribute values received in step S419, in the user attribute value storage unit 114, in association with the terminal identifier. The procedure returns to step S401.

(Step S421) The selecting request receiving unit 144 determines whether or not it has received a selecting request from another service server 1. If it has received a selecting request, the procedure advances to step S422, or otherwise the procedure advances to step S424.

(Step S422) The processing unit 12 performs terminal selecting processing. An example of the terminal selecting processing will be described with reference to the flowchart in FIG. 8. The terminal selecting processing is processing for acquiring a terminal identifier constituting a group list corresponding to the selecting request.

(Step S423) The terminal identifier transmitting part 1285 transmits the one or more terminal identifiers acquired in step S422, to the other service server 1 that transmitted the selecting request. The procedure returns to step S401. In this example, there may be a case in which one or more terminal identifiers cannot be transmitted.

(Step S424) The processing unit 12 determines whether or not the second condition is satisfied. If the second condition is satisfied, the procedure advances to step S425, or otherwise the procedure advances to step S426. The second condition is that a down instruction is received from the external server 3, or that the load indicated by the load information is low enough to satisfy a condition (e.g., the number of terminal apparatuses 4 to which a service is being provided by the service unit 121 is less than or equal to a threshold value), for example.

(Step S425) The down unit 126 performs the down processing. The procedure returns to step S401. An example of the down processing will be described with reference to the flowchart in FIG. 9.

(Step S426) The processing unit 12 determines whether or not the third condition is satisfied. If the third condition is satisfied, the procedure advances to step S427, or otherwise the procedure advances to step S428. The third condition is that a startup instruction is received from the external server 3, for example.

(Step S427) The startup unit 127 starts up the service server 1. The procedure returns to step S401.

(Step S428) The receiving unit 14 determines whether or not it has received a transfer request. If it has received a transfer request, the procedure advances to step S429, or otherwise the procedure returns to step S401.

(Step S429) The processing unit 12 performs transfer accepting processing, which is processing corresponding to the transfer request. An example of the transfer accepting processing will be described with reference to the flowchart in FIG. 10. The procedure returns to step S401.

Figure 4:
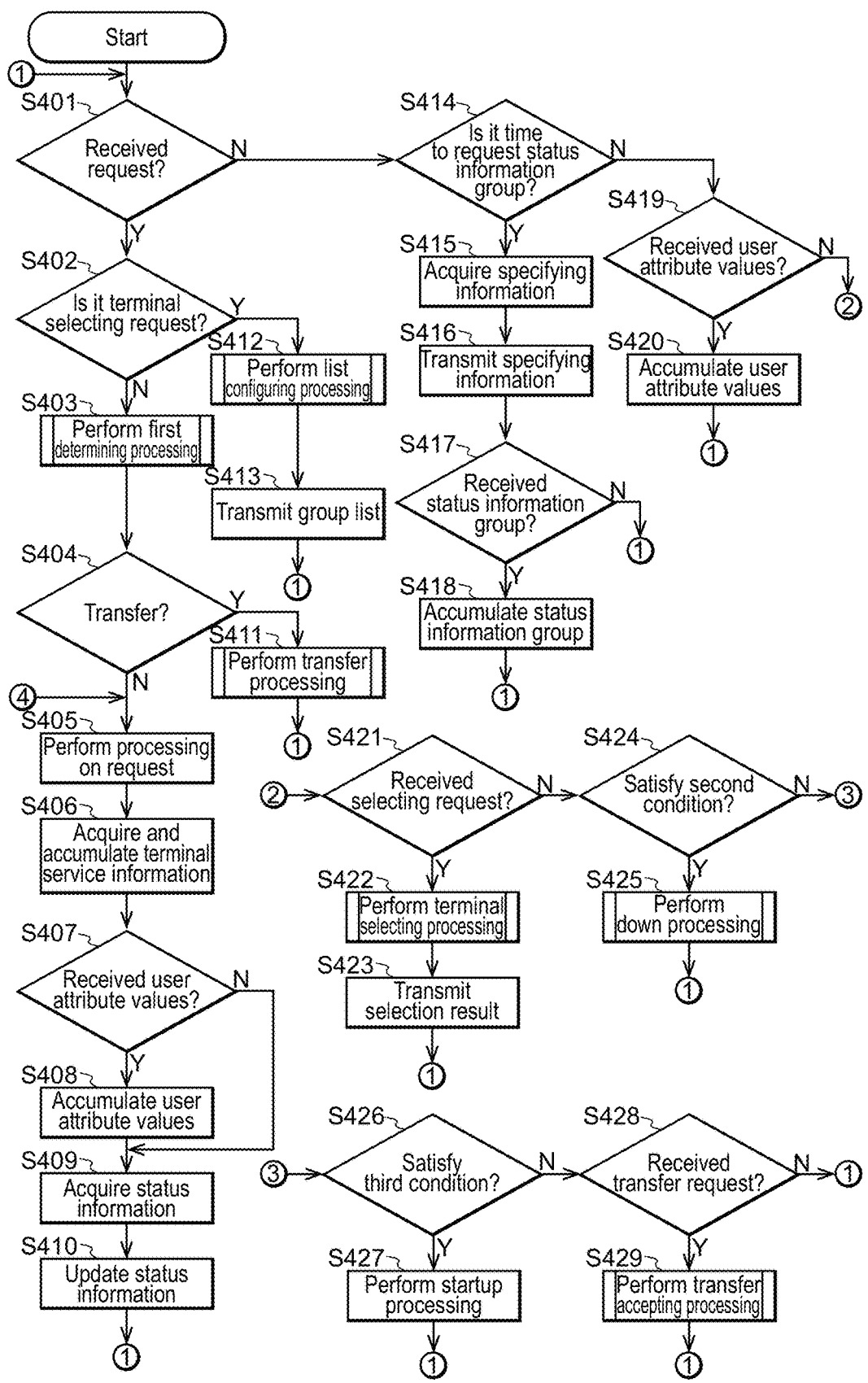
FIG. 4 is a flowchart illustrating an operation example of the service server 1 in the embodiment.

In the flowchart in FIG. 4, the processing unit 12 periodically or constantly acquires the load information of the service server 1, for example. Then, the transmitting unit 13 preferably transmits the acquired load information periodically or constantly to the external server 3.

In the flowchart in FIG. 4, the processing ends at power off or at an interruption of termination processing.

Figure 5:
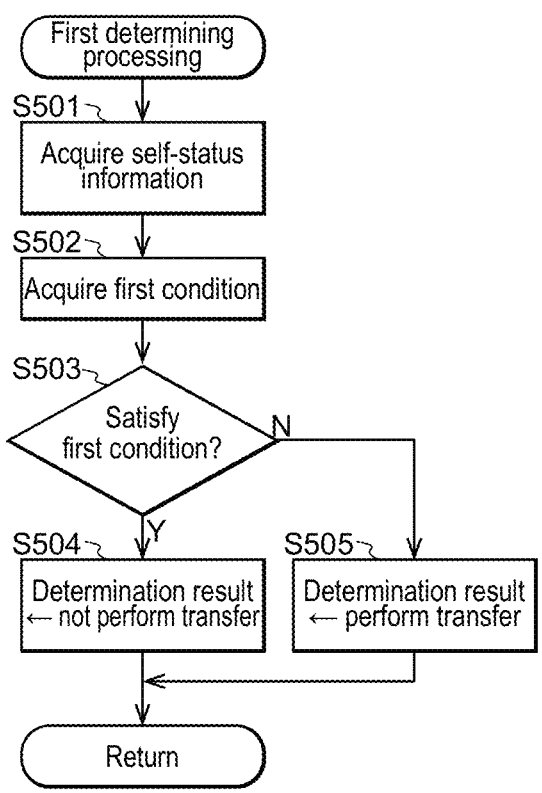
FIG. 5 is a flowchart illustrating an example of first determining processing in the embodiment.

Next, an example of the first determining processing in step S403 will be described with reference to the flowchart in FIG. 5.

(Step S501) The first determining unit 124 acquires current self-status information from the self-status storage unit 111.

(Step S502) The first determining unit 124 acquires a first condition. The first determining unit 124 acquires processing target information from the received request, and configures a first condition having the processing target information (e.g., processing target information), for example. The first determining unit 124 reads the first condition (e.g., the maximum number of terminal apparatuses to which a service can be provided) from the storage unit 11, for example.

(Step S503) The first determining unit 124 determines whether or not the self-status information acquired in step S501 satisfies the first condition acquired in step S502. If it satisfies the first condition, the procedure advances to step S504, or otherwise the procedure advances to step S505.

The first determining unit 124 determines whether or not the processing target information contained in the received request is contained in the one or more pieces of processing target information contained in the self-status information (whether or not the request is within the range of services that the service server 1 can handle), for example.

In the case in which the received request is the first access and the request is accepted, when the number of terminal apparatuses 4 to which a service is to be provided increases, the first determining unit 124 determines whether or not that number is more than "the maximum number of terminal apparatuses to which a service can be provided" contained in the self-status information, for example.

(Step S504) The first determining unit 124 substitutes the information "not perform transfer" for the variable "determination result".

(Step S505) The first determining unit 124 substitutes the information "perform transfer" for the variable "determination result". The procedure returns to the upper-level processing.

Figure 6:
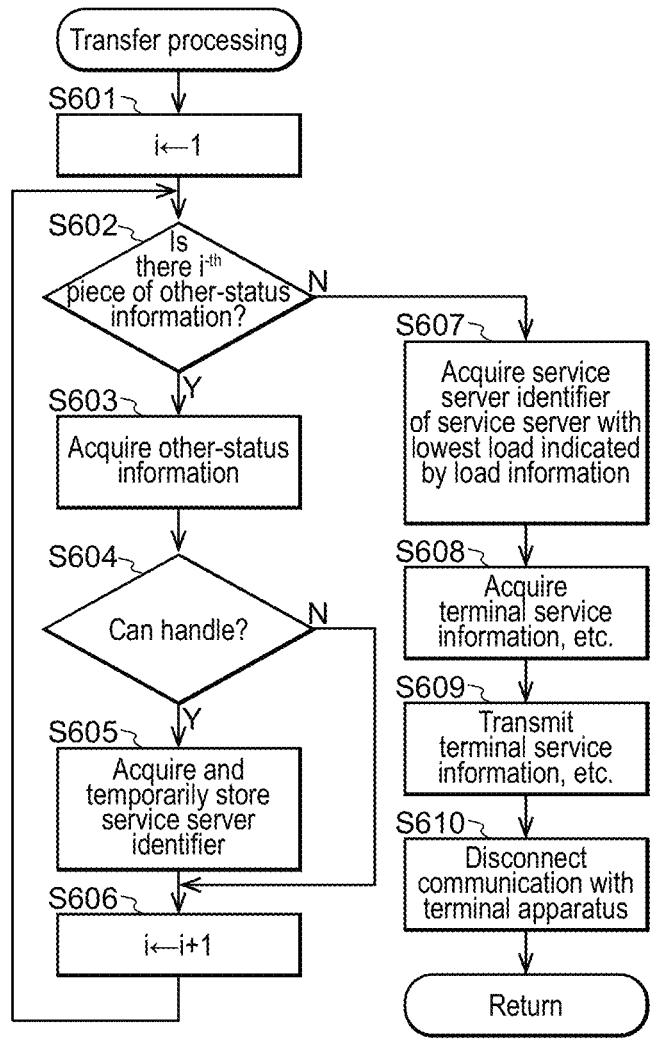
FIG. 6 is a flowchart illustrating an example of transfer processing in the embodiment.

Next, an example of the transfer processing in step S411 will be described with reference to the flowchart in FIG. 6.

(Step S601) The transfer server determining part 1251 substitutes 1 for a counter i.

(Step S602) The transfer server determining part 1251 determines whether or not an $i^{-th}$ piece of other-status information is stored in the other-status storage unit 112. If an $i^{-th}$ piece of other-status information is stored, the procedure advances to step S603, or otherwise the procedure advances to step S607.

(Step S603) The transfer server determining part 1251 acquires the $i^{-th}$ piece of other-status information from the other-status storage unit 112.

(Step S604) The transfer server determining part 1251 determines whether or not another service server 1 corresponding to the other-status information can provide a service to the terminal apparatus 4 subjected to transfer, using the $i^{-th}$ piece of other-status information. If it can provide a service, the procedure advances to step S605, or otherwise the procedure advances to step S606.

(Step S605) The transfer server determining part 1251 acquires a service server identifier that is paired with the $i^{-th}$ piece of other-status information, from the other-status storage unit 112, and temporarily stores the service server identifier in an unshown buffer.

(Step S606) The transfer server determining part 1251 increments the counter i by 1. The procedure returns to step S602.

(Step S607) The transfer server determining part 1251 acquires load information that is paired with each of the one or more service server identifiers temporarily stored in the unshown buffer, from the other-status storage unit 112. Then, the transfer server determining part 1251 acquires a service server identifier of a service server with the lowest load information acquired.

(Step S608) The transfer processing part 1252 acquires a terminal identifier of the terminal apparatus 4 subjected to transfer. The transfer processing part 1252 acquires terminal service information that is paired with the terminal identifier, from the terminal service information storage unit 113. If there is any request that was transmitted from the terminal apparatus 4 and that has not been processed, that request is acquired. Then, the transfer processing unit 125 configures information that is to be transmitted, the information containing the terminal service information. The information that is to be transmitted contains a terminal identifier, terminal service information, and a request, for example.

(Step S609) The transfer processing part 1252 transmits the terminal service information and the like acquired in step S608, to the other service server 1 identified with the service server identifier acquired in step S607.

(Step S610) The transfer processing part 1252 disconnects communication with the terminal apparatus 4. The procedure returns to the upper-level processing.

Next, an example of the list configuring processing in step S412 will be described with reference to the flowchart in FIG. 7.

(Step S701) The grouping unit 128 performs terminal selecting processing for selecting a terminal out of the terminal apparatuses 4 to which a service is being provided by the service unit 121. An example of the terminal selecting processing will be described with reference to the flowchart in FIG. 8.

(Step S702) The grouping unit 128 determines whether or not the number of terminals needed is larger than the number of terminals selected in step S701. If the number of terminals needed is larger, the procedure advances to step S703, or otherwise the procedure advances to step S707. The fact that a terminal is needed means that a group user constituting a group list is needed. A condition for this determination is stored in the storage unit 11. The condition for this determination is "the maximum number of people constituting the group", for example.

(Step S703) The request transmitting part 1281 transmits a selecting request to one or more other service servers 1. The selecting request has one or more user attribute values or an attribute value condition.

(Step S704) The terminal identifier receiving part 1282 determines whether or not it has received a selection result from another service server 1. If it has received a selection result, the procedure advances to step S705, or otherwise the procedure returns to step S704. The selection result contains one or more terminal identifiers or information indicating "no selection".

(Step S705) The grouping unit 128 determines whether or not it has received a selection result from all other service servers 1 to which the selecting request was transmitted. If it has received a selection result from all other service servers 1, the procedure advances to step S706, or otherwise the procedure returns to step S704.

(Step S706) The group list configuring part 1283 acquires terminal identifiers constituting a group list, using the terminal identifiers acquired in step S701 and the terminal identifiers contained in the selection result received in step S704.

The terminal identifiers that are acquired in this example typically include the terminal identifier of the terminal apparatus 4 that transmitted the terminal selecting request. If the number of terminals constituting the group list is predetermined, and the total number of the terminal identifiers acquired in step S701 and the terminal identifiers contained in the selection result received in step S704 is more than the predetermined number of terminals, the group list configuring part 1283 selects a terminal identifier corresponding to the user attribute value whose difference from the user attribute value corresponding to the terminal selecting request is smaller (e.g., the same user attribute value), for example.

(Step S707) The group list configuring part 1283 configures a group list containing the two or more terminal identifiers acquired in step S706. The procedure returns to the upper-level processing.

Figure 7:
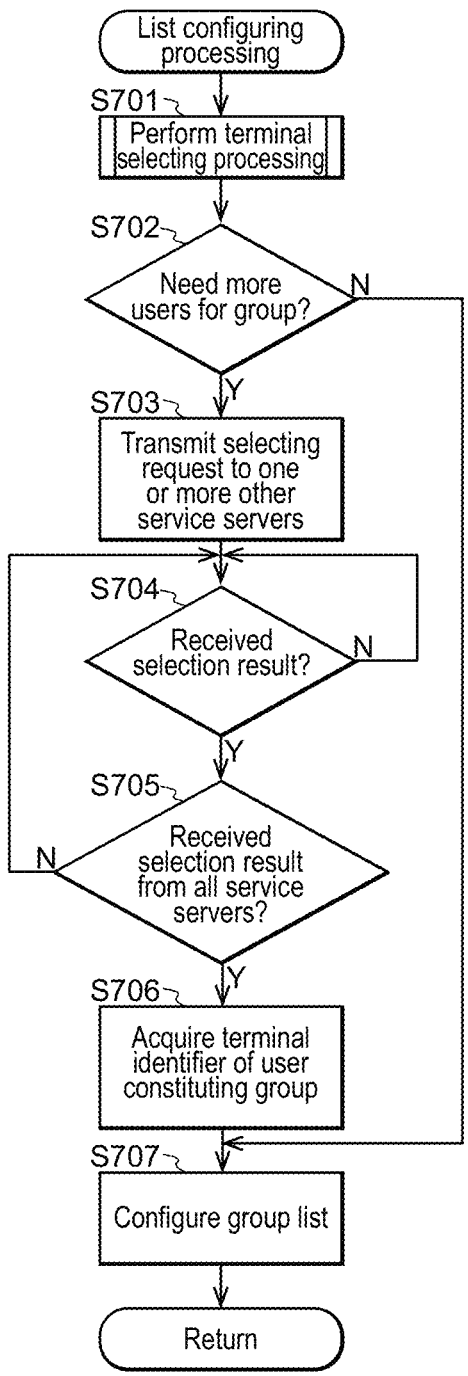
FIG. 7 is a flowchart illustrating an example of list configuring processing in the embodiment.

In the flowchart in FIG. 7, the processing in step S701 may not be performed.

Figure 8:
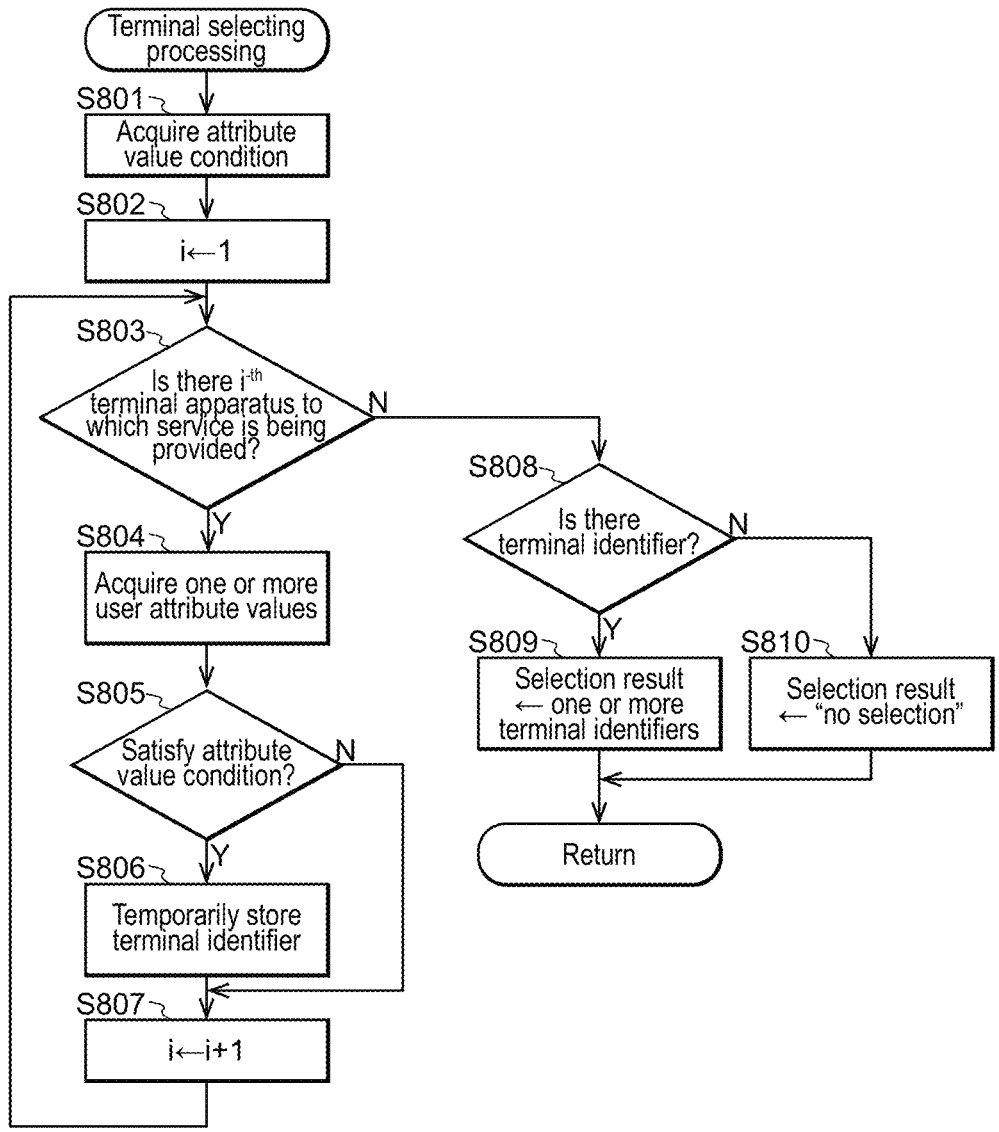
FIG. 8 is a flowchart illustrating an example of terminal selecting processing in the embodiment.

Next, an example of the terminal selecting processing in step S422 will be described with reference to the flowchart in FIG. 8.

(Step S801) The terminal selecting part 1284 acquires an attribute value condition, using the one or more user attribute values contained in the selecting request. If the selecting request contains an attribute value condition, the terminal selecting part 1284 acquires the attribute value condition contained in the selecting request.

For example, if the one or more user attribute values contained in the selecting request are "user's game level", the terminal selecting part 1284 acquires the attribute value condition "matches the user's game level", "the difference from the user's game level is less than or equal to a threshold value", or "the difference from the user's game level is less than a threshold value", for example.

(Step S802) The terminal selecting part 1284 substitutes 1 for a counter i.

(Step S803) The terminal selecting part 1284 determines whether or not there is an $i^{-th}$ terminal apparatus 4 to which a service is being provided by the service unit 121. If there is an $i^{-th}$ terminal apparatus 4, the procedure advances to step S804, or otherwise the procedure advances to step S808.

The terminal selecting part 1284 determines whether or not there is an $i^{-th}$ terminal identifier stored in the terminal service information storage unit 113, for example. That is to say, the terminal identifier and the terminal service information are stored in the terminal service information storage unit 113 only when the service unit 121 is providing a service.

(Step S804) The terminal selecting part 1284 acquires one or more user attribute values that are paired with the terminal identifier for identifying the $i^{-th}$ terminal apparatus 4, from the user attribute value storage unit 114. The one or more user attribute values are "user's game level", for example.

(Step S805) The terminal selecting part 1284 determines whether or not the one or more user attribute values acquired in step S804 satisfy the attribute value condition acquired in step S801. If they satisfy the attribute value condition, the procedure advances to step S806, or otherwise the procedure advances to step S807.

(Step S806) The terminal selecting part 1284 acquires the terminal identifier corresponding to the $i^{-th}$ terminal apparatus 4, from the terminal service information storage unit 113, and temporarily stores the terminal identifier in an unshown buffer.

(Step S807) The terminal selecting part 1284 increments the counter i by 1. The procedure returns to step S803.

(Step S808) The terminal selecting part 1284 determines whether or not there is a terminal identifier in the unshown buffer. If there is a terminal identifier, the procedure advances to step S809, or otherwise the procedure advances to step S810.

(Step S809) The terminal selecting part 1284 substitutes one or more terminal identifiers stored in the unshown buffer for the variable "selection result". The procedure returns to the upper-level processing.

(Step S810) The terminal selecting part 1284 substitutes information indicating "no selection" for the variable "selection result". The procedure returns to the upper-level processing.

Next, an example of the down processing in step S425 will be described with reference to the flowchart in FIG. 9.

(Step S901) The down unit 126 determines whether or not there is a terminal apparatus 4 to which a service is being provided by the service unit 121. If there is a terminal apparatus 4 to which a service is being provided, the procedure advances to step S902, or otherwise the procedure advances to step S911.

(Step S902) The down unit 126 acquires terminal service information that is paired with the terminal identifiers of all terminal apparatuses 4 to which a service is being provided, from the terminal service information storage unit 113.

(Step S903) The down unit 126 substitutes 1 for a counter i.

(Step S904) The down unit 126 determines whether or not the service is allowed to be interrupted, based on the terminal service information that is paired with the $i^{-th}$ terminal identifier. If it is determined that the service may be interrupted, the procedure advances to step S905, or otherwise the procedure advances to step S908.

A condition for interruption is stored in the storage unit 11, and the down unit 126 determines whether or not this condition is matched. The condition for interruption is preferably a condition regarding terminal service information (e.g., that the service provision has reached the stage of the stored break). There is no limitation on the condition for interruption.

(Step S905) The transfer processing unit 125 and the like perform transfer processing the terminal apparatus 4 identified with the $i^{-th}$ terminal identifier.

(Step S906) The down unit 126 increments the counter i by 1.

(Step S907) The down unit 126 determines whether or not there is an $i^{-th}$ piece of terminal service information corresponding to the terminal apparatus 4 to which a service is being provided by the service unit 121. If there is an $i^{-th}$ piece of terminal service information, the procedure returns to step S904, or otherwise the procedure returns to step S901.

(Step S908) The down unit 126 determines whether or not it has received a request from the terminal apparatus 4 identified with the $i^{-th}$ terminal identifier. If it has received a request, the procedure advances to step S909, or otherwise the procedure advances to step S906.

(Step S909) The service unit 121 performs processing on the received request.

(Step S910) The service unit 121 acquires terminal service information containing a result of the processing in step S909, and accumulates the terminal service information in the terminal service information storage unit 113 in association with the terminal identifier corresponding to the received request. The procedure advances to step S906.

(Step S911) The down unit 126 performs processing for causing the service server 1 to go down. The procedure returns to the upper-level processing.

Figure 9:
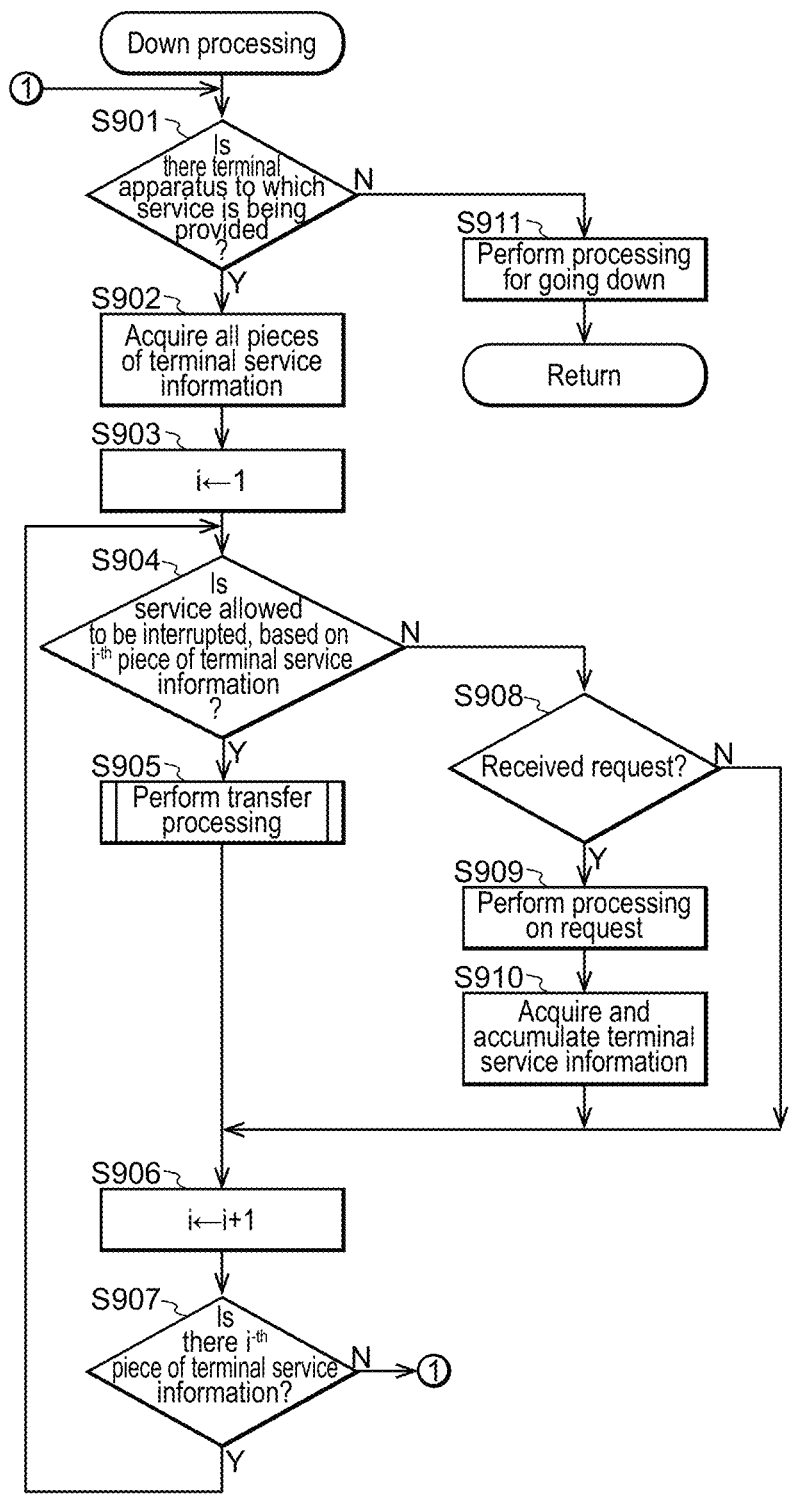
FIG. 9 is a flowchart illustrating an example of down processing in the embodiment.

In the flowchart in FIG. 9, it is sufficient to perform the transfer processing on all terminal apparatuses 4 to which a service is being provided, before performing the down processing, and there is no limitation on the procedure thereof.

Figure 10:
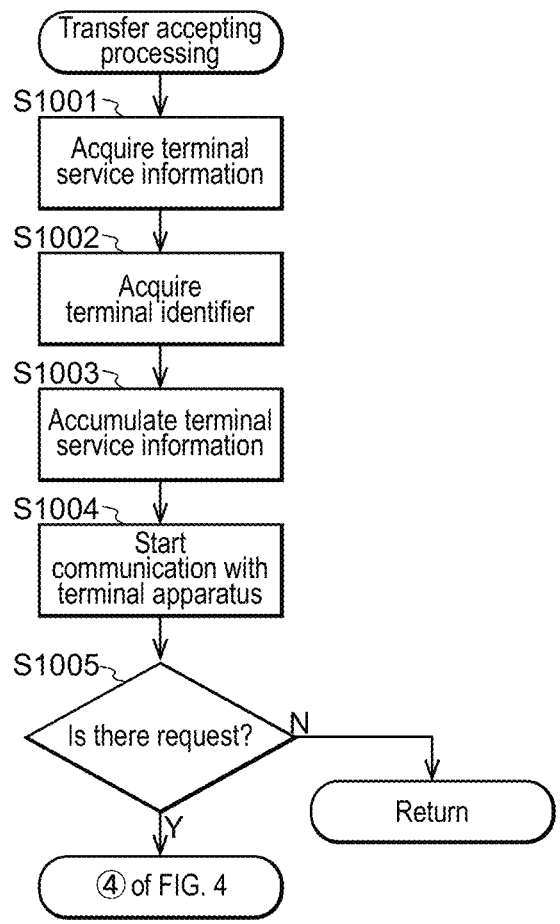
FIG. 10 is a flowchart illustrating an example of transfer accepting processing in the embodiment.

Next, an example of the transfer accepting processing in step S429 will be described with reference to the flowchart in FIG. 10.

(Step S1001) The terminal service information accumulating part 1254 acquires terminal service information contained in the received transfer request.

(Step S1002) The terminal service information accumulating part 1254 acquires a terminal identifier contained in the received transfer request.

(Step S1003) The terminal service information accumulating part 1254 accumulates the terminal service information acquired in step S1001, in the terminal service information storage unit 113, in association with the terminal identifier acquired in step S1002.

(Step S1004) The communication starting part 1255 starts communication with the terminal apparatus 4 identified with the terminal identifier acquired in step S1002.

(Step S1005) The transfer processing unit 125 determines whether or not there is a request in the received transfer request. If there is a request, the procedure advances to step S405 in FIG. 4, or otherwise the procedure returns to the upper-level processing.

Next, an operation example of the management server 2 will be described with reference to the flowchart in FIG. 11.

(Step S1101) The management receiving unit 22 determines whether or not it has received status information from the service server 1 in association with a service server identifier. If it has received status information, the procedure advances to step S1102, or otherwise the procedure advances to step S1104.

(Step S1102) The management processing unit 23 accumulates the status information received in step S1101, in the management storage unit 21, in association with the service server identifier.

(Step S1103) The management processing unit 23 acquires specifying information, using a status information group containing the status information received in step S1101, which is a status information group containing status information of the two or more service servers 1. Then, the management processing unit 23 accumulates the specifying information in the management storage unit 21 in association with the status information group containing the status information received in step S1101. The procedure returns to step S1101.

(Step S1104) The management receiving unit 22 determines whether or not it has received specifying information from the service server 1. If it has received specifying information, the procedure advances to step S1105, or otherwise the procedure returns to step S1101. The receiving of such specifying information is a request for transmission of a status information group.

(Step S1105) The management processing unit 23 acquires latest specifying information stored in the management storage unit 21.

(Step S1106) The management processing unit 23 determines whether or not there is a predetermined relationship between the specifying information received in step S1104 and the latest specifying information acquired in step S1105 (e.g., they match each other). If there is a predetermined relationship, the procedure returns to the upper-level processing, or otherwise the procedure advances to step S1107.

(Step S1107) The management processing unit 23 acquires a status information group corresponding to the latest specifying information. Each piece of status information constituting the acquired status information group is associated with a service server identifier.

(Step S1108) The management transmitting unit 24 transmits the status information group acquired in step S1107, which is a group of pieces of status information each associated with a service server identifier, to the service server 1 that transmitted the specifying information. The procedure returns to step S1101.

Figure 11:
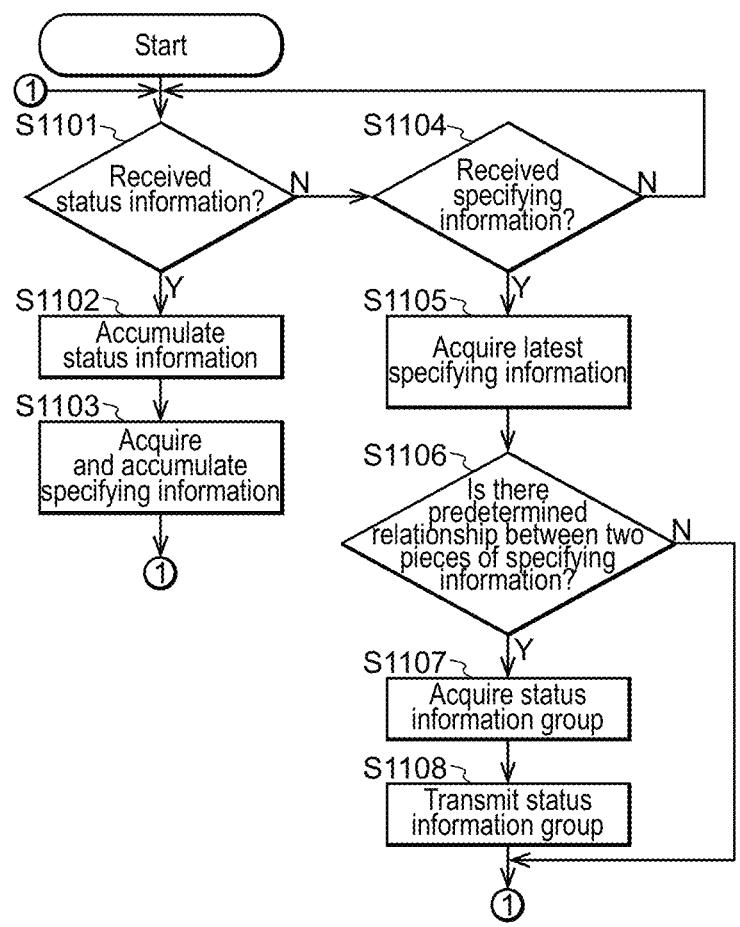
FIG. 11 is a flowchart illustrating an operation example of a management server 2 in the embodiment.

In the flowchart in FIG. 11, the management transmitting unit 24 transmits the latest status information group to the service server 1 in which the latest status information group is not retained. However, the management transmitting unit 24 may transmit the latest status information group to the service server 1 at an appropriate point in time. The appropriate point in time is generally periodically, constantly, or the like, for example.

In the flowchart in FIG. 11, the processing ends at power off or at an interruption of termination processing.

Next, an operation example of the external server 3 will be described with reference to the flowchart in FIG. 12.

(Step S1201) The external receiving unit 32 determines whether or not it has received load information in association with a service server identifier. If it has received load information, the procedure advances to step S1202, or otherwise the procedure advances to step S1203.

(Step S1202) The external processing unit 33 accumulates the load information received in step S1201, in the external storage unit 31, in association with the service server identifier.

(Step S1203) The external processing unit 33 acquires a second condition stored in the external storage unit 31. The second condition is a condition for causing the service server 1 to go down. The second condition is, for example, "the number of terminal apparatuses 4 to which a service is being provided is 0".

(Step S1204) The external processing unit 33 acquires a third condition stored in the external storage unit 31. The third condition is a condition for starting up the service server 1. The third condition is that the load indicated by the total load information of two or more service servers 1 is large enough to satisfy a predetermined condition, for example. The third condition is that the total number of terminals, which is the total load information of two or more service servers 1, is greater than or equal to a threshold value, for example.

(Step S1205) The external processing unit 33 substitutes 1 for a counter i.

(Step S1206) The external processing unit 33 determines whether or not there is an $i^{-th}$ piece of load information in the external storage unit 31. If there is an $i^{-th}$ piece of load information, the procedure advances to step S1207, or otherwise the procedure returns to step S1201.

(Step S1207) The external processing unit 33 determines whether or not the $i^{-th}$ piece of load information satisfies the second condition acquired in step S1203. If the second condition is satisfied, the procedure advances to step S1208, or otherwise the procedure advances to step S1211.

(Step S1208) The external processing unit 33 acquires a service server identifier that is paired with the $i^{-th}$ piece of load information, from the external storage unit 31.

(Step S1209) The external transmitting unit 34 transmits the down instruction to the service server 1 identified with the service server identifier acquired in step S1208. The external processing unit 33 rewrites the load information that is paired with the service server identifier acquired in step S1208, to the information indicating that the service server is down.

(Step S1210) The external processing unit 33 increments the counter i by 1. The procedure returns to step S1206.

(Step S1211) The external processing unit 33 determines whether or not one or at least two pieces of load information (e.g., total load information) stored in the external storage unit 31 satisfy the third condition acquired in step S1204. If the third condition is satisfied, the procedure advances to step S1212, or otherwise the procedure advances to step S1210.

(Step S1212) The external processing unit 33 determines whether or not there is a service server 1 that is currently in the sleep state and to be started up, using the load information in the external storage unit 31. If there is a service server 1 that is to be started up, the procedure advances to step S1213, or otherwise the procedure advances to step S1210.

(Step S1213) The external processing unit 33 acquires a service server identifier of the service server 1 that is currently in the sleep state and to be started up, from the external storage unit 31.

(Step S1214) The external transmitting unit 34 transmits a startup instruction to the service server 1 identified with the service server identifier acquired in step S1213. The procedure advances to step S1210.

Figure 12:
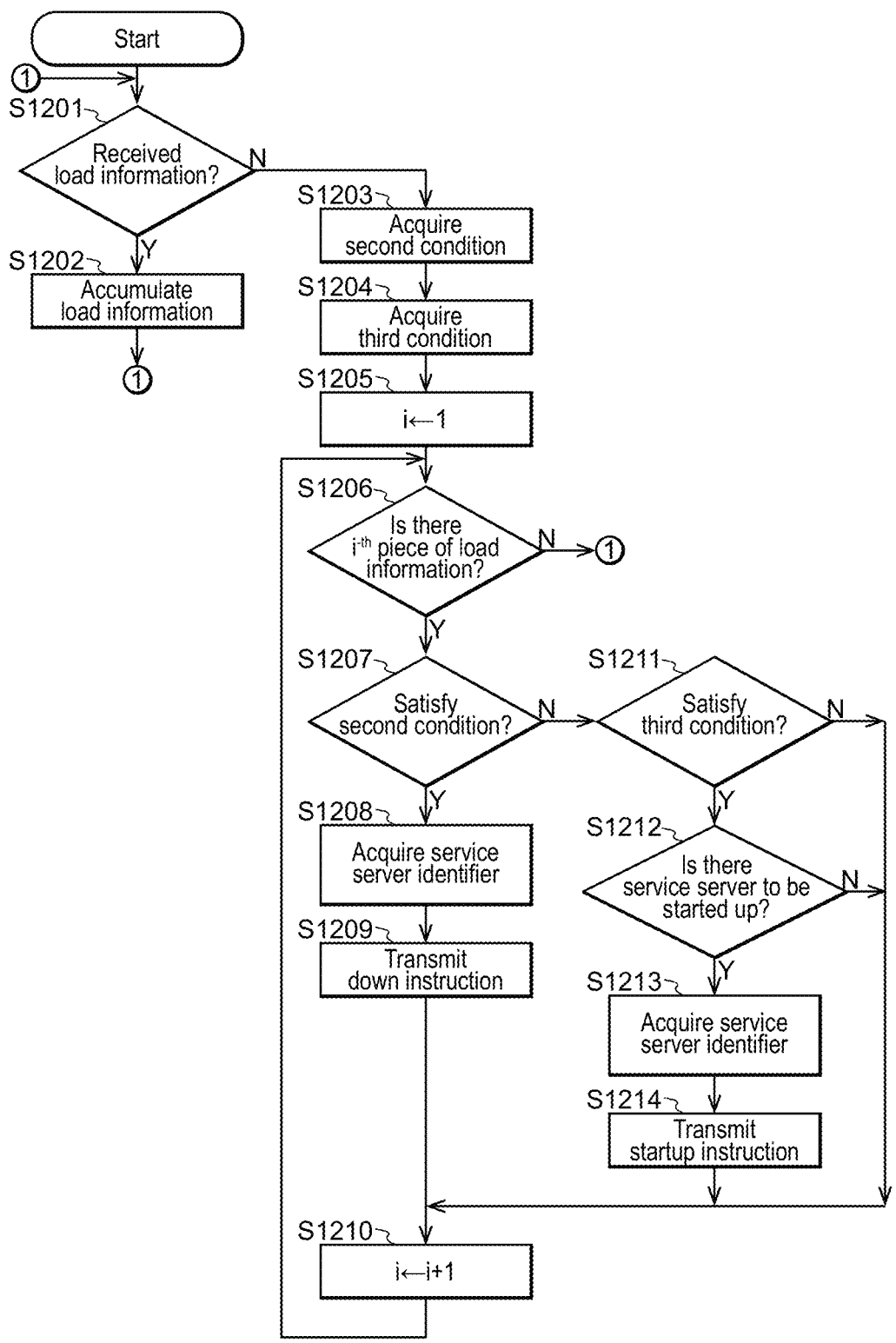
FIG. 12 is a flowchart illustrating an operation example of an external server 3 in the embodiment.

In the flowchart in FIG. 12, the processing ends at power off or at an interruption of termination processing.

Next, an operation example of the terminal apparatus 4 will be described with reference to the flowchart in FIG. 13.

(Step S1301) The terminal accepting unit 42 determines whether or not it has accepted an instruction or the like from a user. If it has accepted an instruction or the like, the procedure advances to step S1302, or otherwise the procedure advances to step S1306.

(Step S1302) The terminal processing unit 43 configures a request using the instruction or the like accepted in step S1301. The terminal processing unit 43 reads a terminal identifier in the terminal storage unit 41, and configures a request associated with the terminal identifier, for example. The request is typically generated by the user's operation on the terminal apparatus 4. However, the request may also be generated by autonomous processing of terminal apparatus 4.

(Step S1303) The terminal transmitting unit 44 transmits the request configured in step S1302, in association with the terminal identifier, to the service server 1 from which a service is to be provided. The service server identifier (e.g., an IP address) of the service server 1 is stored in the terminal storage unit 41, and the terminal transmitting unit 44 transmits the request using this service server identifier.

(Step S1304) The terminal accepting unit 42 determines whether or not it has received a processing result in response to transmission of the request. If it has received a processing result, the procedure advances to step S1305, or otherwise the procedure returns to step S1304.

(Step S1305) The terminal processing unit 43 configures a processing result that is to be output, using the processing result received in step S1304. The terminal output unit 46 outputs the processing result. The procedure returns to step S1301.

(Step S1306) The terminal processing unit 43 determines whether or not to transmit one or more user attribute values. If user attribute values are to be transmitted, the procedure advances to step S1307, or otherwise the procedure returns to step S1301.

(Step S1307) The terminal processing unit 43 acquires one or more user attribute values stored in the terminal storage unit 41.

(Step S1308) The terminal transmitting unit 44 transmits the one or more user attribute values acquired in step S1307, in association with the terminal identifier stored in the terminal storage unit 41, to the service server 1. The procedure returns to step S1301. The one or more user attribute values are transmitted at the time when the request is first transmitted. Alternatively, the one or more user attribute values are transmitted at the time of user registration. There is no limitation on the time at which the one or more user attribute values are transmitted.

Figure 13:
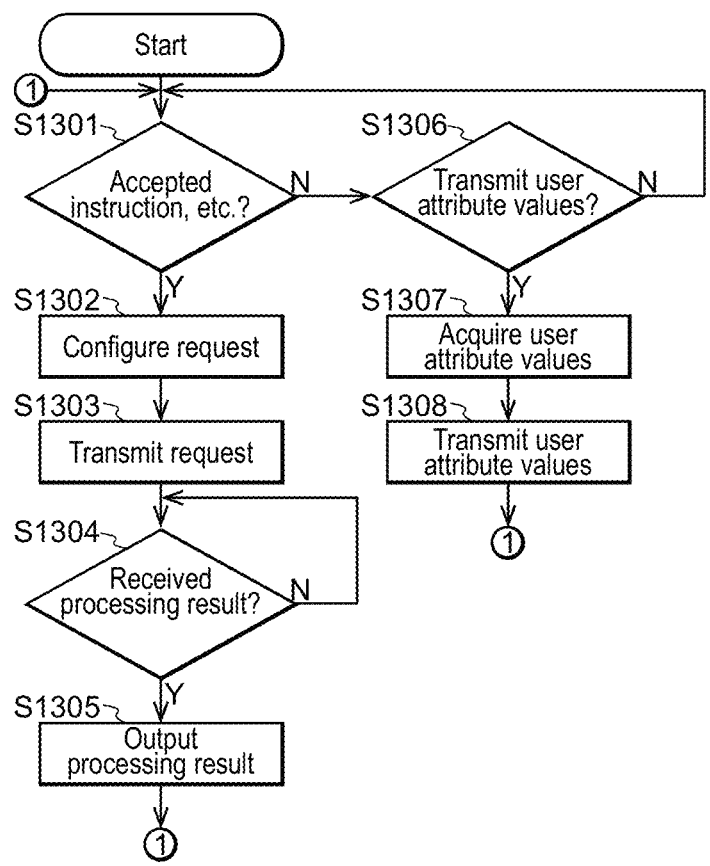
FIG. 13 is a flowchart illustrating an operation example of a terminal apparatus 4 in the embodiment.

In the flowchart in FIG. 13, the processing ends at power off or at an interruption of termination processing.

As described above, according to this embodiment, it is possible to provide an information system A that is robust to failures of a service server that provides a service to the terminal apparatuses 4.

Furthermore, according to this embodiment, whether or not to transmit a status information group is determined using specifying information, and thus it is possible to reduce the communication amount between the service servers 1 and the management server 2.

Furthermore, according to this embodiment, the management server 2 transmits the same status information group to all service servers 1, and thus it is possible to reduce the processing amount of the management server 2.

Furthermore, according to this embodiment, it is possible to appropriately cause the service servers 1 to go down. In particular, before a service server 1 goes down, transfer is performed that enables the terminal apparatuses 4 to which a service is being provided by the service server to receive a service from another service server 1, and thus it is possible to appropriately cause the service server 1 to go down.

Furthermore, according to this embodiment, it is possible to appropriately perform transfer that enables the terminal apparatuses 4 to which a service is being provided by the service server to receive a service from another service server 1.

Furthermore, according to this embodiment, it is possible to appropriately start up the service servers 1. Accordingly, it is possible to appropriately continue the processing of the entire information system A.

Furthermore, according to this embodiment, it is possible to appropriately create a group of the terminal apparatuses 4.

Moreover, according to this embodiment, if the information system A is used for a game, it is possible to enable users to continuously enjoy the game even when a service server 1 that provides a service to the terminal apparatuses 4 fails.

The processing in this embodiment may be realized by software. The software may be distributed by software downloads or the like. Furthermore, the software may be distributed in a form where the software is stored in a recording medium such as a CD-ROM. The same applies to other embodiments in this specification. The software that realizes the service server 1 in this embodiment is the following sort of program. Specifically, this program is a program for causing a computer capable of accessing a self-status storage unit in which self-status information regarding a status of a service server is stored; and an other-status storage unit in which one or more pieces of other-status information each regarding a status of another service server are stored, to function as: a service unit that provides a service to one or more terminal apparatuses; a status transmitting unit that transmits the self-status information to a management server; a status receiving unit that receives one or more pieces of other-status information from the management server; an other-status accumulating unit that accumulates the one or more pieces of other-status information received by the status receiving unit, in the other-status storage unit; a first determining unit that determines whether or not the self-status information satisfies a first condition; and a transfer processing unit that performs transfer processing, which is processing for enabling any one or more terminal apparatuses to which a service is being provided by the service unit to receive a service from another service server, in a case in which the first determining unit determines that the first condition is satisfied.

Furthermore, the software that realizes the management server 2 in this embodiment is the following sort of program. Specifically, this program is a program for causing a computer to function as: a management receiving unit that receives self-status information from each of two or more service servers; and a management transmitting unit that transmits, to each of the two or more service servers, one or more pieces of other-status information at least that are not status information of a service server to which the other-status information is to be transmitted, out of the two or more pieces of self-status information received by the management receiving unit.

Figure 14:
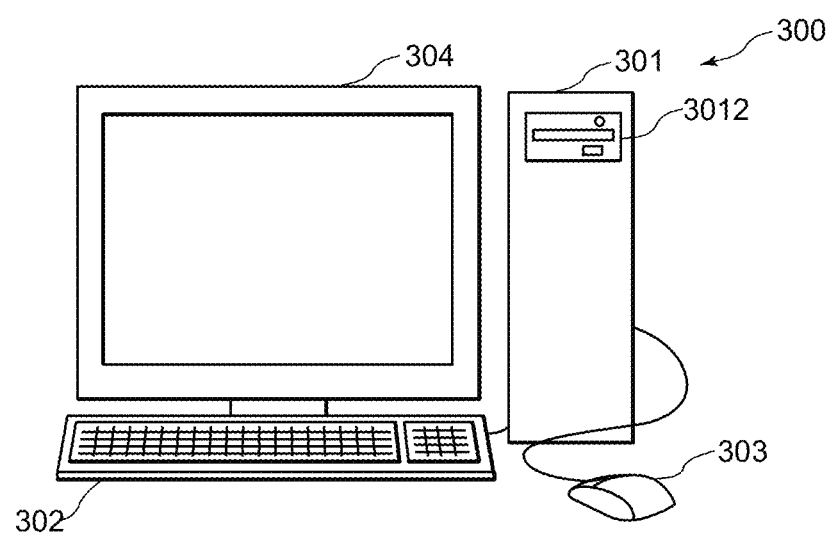
FIG. 14 is a schematic view of a computer system in the embodiment.
Figure 15:
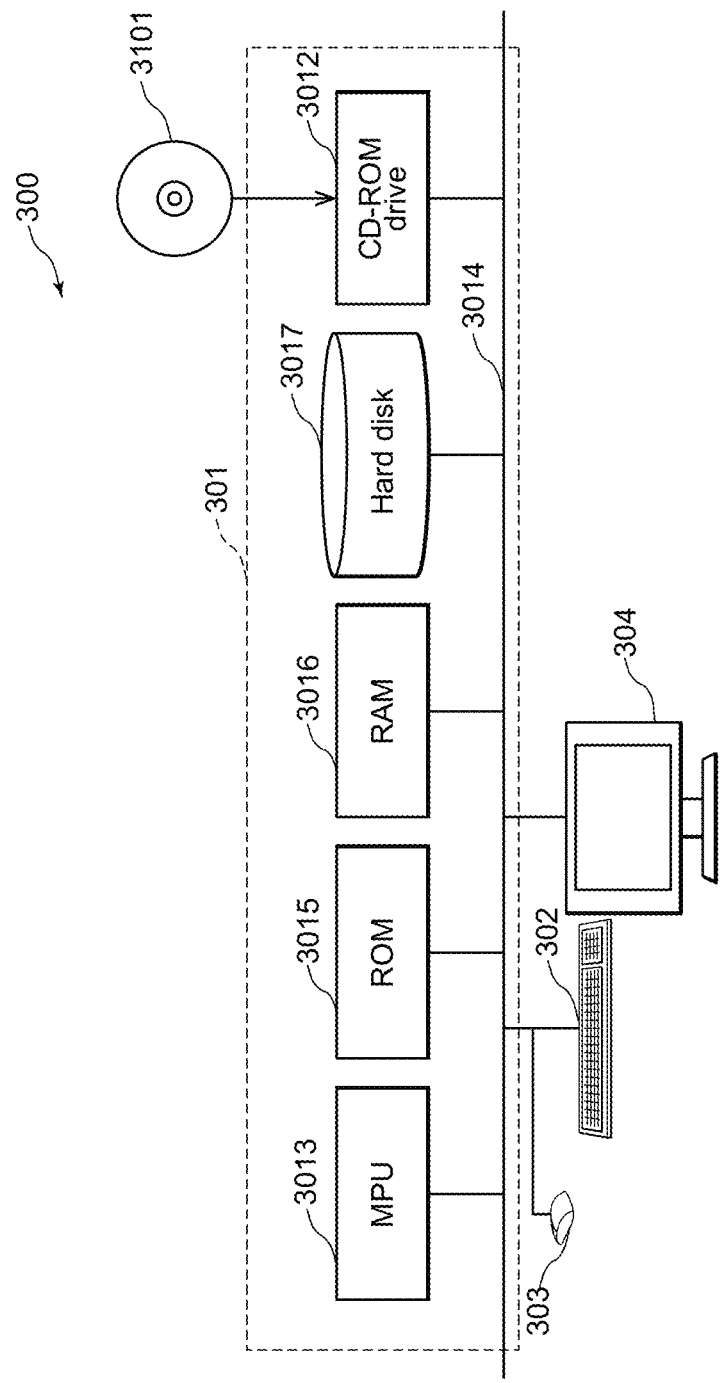
FIG. 15 is a block diagram of the computer system in the embodiment.

FIG. 14 shows the external appearance of a computer that executes the programs described in this specification to realize the service server 1 and the like in the foregoing various embodiment. The foregoing embodiment may be realized using computer hardware and a computer program executed thereon. FIG. 14 is a schematic view of a computer system 300. FIG. 15 is a block diagram of the system 300.

In FIG. 14, the computer system 300 includes a computer 301 including a CD-ROM drive, a keyboard 302, a mouse 303, and a monitor 304.

In FIG. 15, the computer 301 includes, in addition to the CD-ROM drive 3012, an MPU 3013, a bus 3014 connected to the CD-ROM drive 3012 and the like, a ROM 3015 in which a program such as a boot up program is stored, a RAM 3016 that is connected to the MPU 3013 and is a memory in which a command of an application program is temporarily stored and a temporary storage area is provided, and a hard disk 3017 in which an application program, a system program, and data are stored. Although not shown, the computer 301 may further include a network card that provides connection to a LAN.

The program for causing the computer system 300 to execute the functions of the service server 1 and the like in the foregoing embodiment may be stored in a CD-ROM 3101 that is inserted into the CD-ROM drive 3012, and be transmitted to the hard disk 3017. Alternatively, the program may be transmitted via a network (not shown) to the computer 301 and stored in the hard disk 3017. At the time of execution, the program is loaded into the RAM 3016. The program may be loaded from the CD-ROM 3101, or directly from a network.

The program does not necessarily have to include, for example, an operating system (OS) or a third party program to cause the computer 301 to execute the functions of the service server 1 and the like in the foregoing embodiment. The program may only include a command portion to call an appropriate function (module) in a controlled mode and obtain desired results. The manner in which the computer system 300 operates is well known, and thus a detailed description thereof has been omitted.

It should be noted that, in the program, in a step of transmitting information, a step of receiving information, or the like, processing that is performed by hardware, for example, processing performed by a modem or an interface card in the transmitting step (processing that can be performed only by hardware) is not included.

Furthermore, the computer that executes the program may be a single computer, or may be multiple computers. That is to say, centralized processing may be performed, or distributed processing may be performed.

Furthermore, in the foregoing embodiment, it will be appreciated that at least two communication parts in one apparatus may be physically realized by one medium.

In the foregoing embodiment, each process may be realized as centralized processing using a single apparatus, or may be realized as distributed processing using multiple apparatuses.

The present invention is not limited to the embodiment set forth herein. Various modifications are possible within the scope of the present invention.

INDUSTRIAL APPLICABILITY

As described above, the information system according to the present invention has an effect that it is possible to provide an information system that is robust to failures of a service server that provides a service to terminal apparatuses, and thus this apparatus is useful as an information system and the like.

The invention claimed is:

1. An information system comprising: two or more service servers that provide a service to one or more terminal apparatuses; and a management server,
wherein each service server includes:
a self-status storage unit in which self-status information regarding a status of the service server is stored;
an other-status storage unit in which one or more pieces of other-status information each regarding a status of another service server are stored;
a service unit that provides a service to one or more terminal apparatuses;
a status transmitting unit that transmits the self-status information to the management server;
a status receiving unit that receives one or more pieces of other-status information from the management server;
an other-status accumulating unit that accumulates the one or more pieces of other-status information received by the status receiving unit, in the other-status storage unit;
a first determining unit that determines whether or not the self-status information satisfies a first condition;
a transfer processing unit that performs transfer processing, which is processing for enabling any one or more terminal apparatuses to which a service is being provided by the service unit to receive a service from another service server, in a case in which the first determining unit determines that the first condition is satisfied;

a user attribute value receiving unit that receives one or more user attribute values from terminal apparatuses;

a grouping unit that acquires two or more terminal identifiers for identifying terminal apparatuses that satisfy an attribute value condition corresponding to the one or more user attribute values received by the user attribute value receiving unit, thereby acquiring a group list having the two or more terminal identifiers; and a group list transmitting unit that transmits the group list to the terminal apparatuses, and the management server includes:

a management receiving unit that receives self-status information from each of the two or more service servers; and a management transmitting unit that transmits, to each of the two or more service servers, one or more pieces of other-status information at least that are not status information of a service server to which the other-status information is to be transmitted, out of the two or more pieces of self-status information received by the management receiving unit.

2. The information system according to claim 1, wherein the grouping unit includes:

a request transmitting part that transmits a terminal selecting request containing the one or more user attribute values received by the user attribute value receiving unit to one or more other service servers;

a terminal identifier receiving part that receives terminal identifiers of one or more terminal apparatuses that satisfy the attribute value condition, in response to transmission of the terminal selecting request; and a group list configuring part that configures a group list containing the one or more terminal identifiers received by the terminal identifier receiving part.

3. The information system according to claim 1, further comprising:

a user attribute value storage unit in which one or more user attribute values of terminal apparatuses to which a service is being provided by the service unit are stored in association with terminal identifiers; and a selecting request receiving unit that receives the terminal selecting request from another service server, wherein the grouping unit further includes:

a terminal selecting part that selects one or more terminal apparatuses corresponding to a user attribute value that matches the terminal selecting request received by the selecting request receiving unit, out of the terminal apparatuses to which a service is being provided by the service unit, and acquires terminal identifiers for respectively identifying the one or more terminal apparatuses; and a terminal identifier transmitting part that transmits the one or more terminal identifiers acquired by the terminal selecting part, to the service server that transmitted the terminal selecting request.

4. A service server comprising:

a self-status storage unit in which self-status information regarding a status of the service server is stored;

an other-status storage unit in which one or more pieces of other-status information each regarding a status of another service server are stored;

a service unit that provides a service to one or more terminal apparatuses;

a status transmitting unit that transmits the self-status information to a management server;

a status receiving unit that receives one or more pieces of other-status information from the management server;

an other-status accumulating unit that accumulates the one or more pieces of other-status information received by the status receiving unit, in the other-status storage unit;

a first determining unit that determines whether or not the self-status information satisfies a first condition;

a transfer processing unit that performs transfer processing, which is processing for enabling any one or more terminal apparatuses to which a service is being provided by the service unit to receive a service from another service server, in a case in which the first determining unit determines that the first condition is satisfied;

a user attribute value receiving unit that receives one or more user attribute values from terminal apparatuses;

a grouping unit that acquires two or more terminal identifiers for identifying terminal apparatuses that satisfy an attribute value condition corresponding to the one or more user attribute values received by the user attribute value receiving unit, thereby acquiring a group list having the two or more terminal identifiers; and a group list transmitting unit that transmits the group list to the terminal apparatuses.

5. An information processing method realized using a self-status storage unit in which self-status information regarding a status of a service server is stored, an other-status storage unit in which one or more pieces of other-status information each regarding a status of another service server are stored, a service unit, a status transmitting unit, a status receiving unit, an other-status accumulating unit, a first determining unit, a transfer processing unit, a user attribute value receiving unit, a grouping unit, and a group list transmitting unit, comprising:

a service step of the service unit providing a service to one or more terminal apparatuses;

a status transmitting step of the status transmitting unit transmitting the self-status information to a management server;

a status receiving step of the status receiving unit receiving one or more pieces of other-status information from the management server;

an other-status accumulating step of the other-status accumulating unit accumulating the one or more pieces of other-status information received in the status receiving step, in the other-status storage unit;

a first determining step of the first determining unit determining whether or not the self-status information satisfies a first condition;

a transfer processing step of the transfer processing unit performing transfer processing, which is processing for enabling any one or more terminal apparatuses to which a service is being provided in the service step to receive a service from another service server, in a case in which it is determined in the first determining step that the first condition is satisfied;

a user attribute value receiving step of the user attribute value receiving unit receiving one or more user attribute values from terminal apparatuses;

a grouping step of the grouping unit acquiring two or more terminal identifiers for identifying terminal apparatuses that satisfy an attribute value condition corresponding to the one or more user attribute values received in the user attribute value receiving step, thereby acquiring a group list having the two or more terminal identifiers; and a group list transmitting step of the group list transmitting unit transmitting the group list to the terminal apparatuses.

* * * * *